(12) United States Patent
Breed et al.

(10) Patent No.: US 6,735,506 B2
(45) Date of Patent: May 11, 2004

(54) TELEMATICS SYSTEM

(75) Inventors: David S. Breed, Morris County, NJ (US); Wilbur E. DuVall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 62 days.

(21) Appl. No.: 10/174,709

(22) Filed: Jun. 19, 2002

(65) Prior Publication Data

US 2002/0188392 A1 Dec. 12, 2002

Related U.S. Application Data

(63) Continuation-in-part of application No. 09/753,186, filed on Jan. 2, 2001, which is a continuation-in-part of application (List continued on next page.)

(60) Provisional application No. 60/304,013, filed on Jul. 9, 2001, provisional application No. 60/291,511, filed on May 16, 2001, provisional application No. 60/269,415, filed on Feb. 16, 2000, and provisional application No. 60/231,378, filed on Sep. 8, 2000.

(51) Int. Cl.[7] .................................................. G06F 7/00
(52) U.S. Cl. ....................................................... 701/36
(58) Field of Search ............................ 701/29, 36, 45, 701/46; 280/728.1, 734, 735; 307/9.1

(56) References Cited

U.S. PATENT DOCUMENTS

| 3,275,975 | A | 9/1966 | King ............................. 340/1 |
| 3,974,350 | A | 8/1976 | Breed .......................... 200/61 |
| 4,198,864 | A | 4/1980 | Breed .......................... 73/492 |
| 4,284,863 | A | 8/1981 | Breed ..................... 200/61.53 |

(List continued on next page.)

FOREIGN PATENT DOCUMENTS

| DE | 3802159 | 8/1989 | ................. 280/735 |
| DE | 4023109 | 1/1992 | |
| DE | 0 669 227 | 8/1995 | |
| JP | 60054589 | 3/1985 | |
| JP | 1-197151 | 8/1989 | ................. 180/287 |
| JP | 3-42337 | 2/1991 | ................. 180/273 |
| JP | 3-159838 | 7/1991 | |
| WO | 94/22693 | 10/1994 | ................. 280/735 |
| WO | 95/27635 | 10/1995 | |
| WO | 00/18031 | 3/2000 | |

OTHER PUBLICATIONS

"Trends in Sensing Frontal Impacts", D. Breed et al., SAE Paper No. 890750, Feb., 1989.

"A Critique of Single Point Sensing", D. Breed et al., SAE Paper No. 920124, Feb., 1992.

*Primary Examiner*—Yonel Beaulieu
(74) *Attorney, Agent, or Firm*—Brian Roffe

(57) ABSTRACT

Vehicular telematics system including an occupant sensing system for determining a property or characteristic of occupancy of the vehicle constituting information about the occupancy of the vehicle and a communications device coupled to the occupant sensing system for transmitting the information. The occupant sensing system may include sensors, for example, an image-obtaining sensor for obtaining images of the passenger compartment of the vehicle, a motion sensor, receivers arranged to receive waves, energy or radiation from seating locations in the passenger compartment, heartbeat sensors, weight sensors associated with seats in the vehicle and/or chemical sensors. Vehicle sensors may be provided, each sensing a state of the vehicle or a state of a component of the vehicle. The communications device is coupled, wired or wirelessly, directly or indirectly, to each vehicle sensor and transmits the state of the vehicle or the state of the component of the vehicle.

49 Claims, 10 Drawing Sheets

Related U.S. Application Data

No. 09/137,918, filed on Aug. 20, 1998, now Pat. No. 6,175,787, which is a continuation-in-part of application No. 08/476,077, filed on Jun. 7, 1995, now Pat. No. 5,809,437, application No. 10/174,709, which is a continuation-in-part of application No. 10/079,065, filed on Feb. 19, 2002, which is a continuation-in-part of application No. 09/765,558, filed on Jan. 19, 2001, application No. 10/174,709, which is a continuation-in-part of application No. 10/114,533, filed on Apr. 2, 2002, which is a continuation-in-part of application No. 10/058,706, filed on Jan. 28, 2002, which is a continuation-in-part of application No. 09/891,432, filed on Jun. 26, 2001, which is a continuation-in-part of application No. 09/838,920, filed on Apr. 20, 2001, which is a continuation-in-part of application No. 09/563,556, filed on May 3, 2000, which is a continuation-in-part of application No. 09/437,535, filed on Nov. 10, 1999, which is a continuation-in-part of application No. 09/047,703, filed on Mar. 25, 1998, now Pat. No. 6,039,139, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,703, is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, which is a continuation-in-part of application No. 07/878,571, filed on May 5, 1992, now abandoned, said application No. 10/058,706, is a continuation-in-part of application No. 09/639,299, filed on Aug. 15, 2000, which is a continuation-in-part of application No. 08/905,877, filed on Aug. 4, 1997, now Pat. No. 6,186,537, which is a continuation of application No. 08/505,036, filed on Jul. 1, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299, is a continuation-in-part of application No. 09/409,625, filed on Oct. 1, 1999, now Pat. No. 6,270,116, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299, is a continuation-in-part of application No. 09/448,338, filed on Nov. 23, 1999, now Pat. No. 6,168,186, which is a continuation-in-part of application No. 08/905,877, filed on Aug. 4, 1997, now Pat. No. 6,186,537, which is a continuation of application No. 08/505,036, filed on Jul. 1, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 10/058,706, is a continuation-in-part of application No. 09/543,678, filed on Apr. 7, 2000, which is a continuation-in-part of application No. 09/047,704, filed on Mar. 25, 1998, now Pat. No. 6,116,638, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,704, is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, which is a continuation-in-part of application No. 07/878,571

U.S. PATENT DOCUMENTS

| Patent No. | | Date | Inventor | Class |
|---|---|---|---|---|
| 4,329,549 | A | 5/1982 | Breed | 200/61.45 M |
| 4,573,706 | A | 3/1986 | Breed | 280/734 |
| 4,683,373 | A | 7/1987 | Tupman | 180/272 |
| 4,900,880 | A | 2/1990 | Breed | 200/61.45 M |
| 4,933,515 | A | 6/1990 | Behr et al. | 200/61.45 M |
| 4,995,639 | A | 2/1991 | Breed | 280/735 |
| 5,071,160 | A | 12/1991 | White et al. | 280/735 |
| 5,074,583 | A | 12/1991 | Fujita et al. | 280/735 |
| 5,118,134 | A | 6/1992 | Mattes et al. | 280/735 |
| 5,222,761 | A | 6/1993 | Kaji et al. | 280/735 |
| 5,322,323 | A | 6/1994 | Ohno et al. | 280/735 |
| 5,330,226 | A | 7/1994 | Gentry et al. | 280/735 |
| 5,366,241 | A | 11/1994 | Kithil | 280/735 |
| 5,398,185 | A | 3/1995 | Omura | 280/735 |
| 5,413,378 | A | 5/1995 | Steffens, Jr. et al. | 280/735 |
| 5,446,661 | A | 8/1995 | Gioutsos et al. | 280/735 |
| 5,454,591 | A | 10/1995 | Mazur et al. | 280/735 |
| 5,474,327 | A | 12/1995 | Schousek | 280/735 |
| 5,482,314 | A | 1/1996 | Corrado et al. | 280/735 |
| 5,484,166 | A | 1/1996 | Mazur et al. | 280/735 |
| 5,528,698 | A | * 6/1996 | Kamei et al. | 382/100 |
| 5,602,734 | A | 2/1997 | Kithil | 364/424.055 |
| 5,605,348 | A | 2/1997 | Blackburn et al. | 280/735 |
| 5,653,462 | A | 8/1997 | Breed et al. | 280/735 |
| 5,691,693 | A | 11/1997 | Kithil | 340/439 |
| 5,699,057 | A | 12/1997 | Ikeda et al. | 340/937 |
| 5,722,686 | A | * 3/1998 | Blackburn | 280/735 |
| 5,748,473 | A | 5/1998 | Breed et al. | 701/45 |
| 5,758,899 | A | 6/1998 | Foo et al. | 280/735 |
| 5,802,479 | A | 9/1998 | Kithil et al. | 701/45 |
| 5,829,782 | A | 11/1998 | Breed et al. | 280/735 |
| 5,844,486 | A | 12/1998 | Kithil et al. | 340/573 |
| 5,848,802 | A | 12/1998 | Breed et al. | 280/735 |
| 5,871,232 | A | 2/1999 | White | 280/735 |
| 5,885,129 | A | 3/1999 | Norris | 446/405 |
| 5,889,870 | A | 3/1999 | Norris | 381/77 |
| 5,890,085 | A | 3/1999 | Corrado et al. | 180/271 |
| 5,901,978 | A | 5/1999 | Breed et al. | 280/735 |
| 5,935,182 | A | 8/1999 | Foo et al. | 701/45 |
| 5,943,295 | A | 8/1999 | Varga et al. | 367/99 |
| 5,948,031 | A | 9/1999 | Jinno et al. | 701/45 |
| 5,997,033 | A | 12/1999 | Gray et al. | 280/735 |
| 6,005,485 | A | 12/1999 | Kursawe et al. | 180/271 |
| 6,007,095 | A | 12/1999 | Stanley | 280/735 |
| 6,014,602 | A | 1/2000 | Kithil et al. | 280/735 |
| 6,016,351 | A | 1/2000 | Raida et al. | 381/77 |

| | | | |
|---|---|---|---|
| 6,018,693 A | 1/2000 | Blackburn et al. | 280/735 |
| 6,020,812 A | 2/2000 | Thompson et al. | 280/735 |
| 6,025,783 A | 2/2000 | Steffens, Jr. | 280/735 |
| 6,026,340 A | 2/2000 | Corrado et al. | 280/735 |
| 6,027,138 A | 2/2000 | Tanaka et al. | 280/735 |
| 6,028,537 A * | 2/2000 | Suman et al. | 340/988 |
| 6,029,105 A | 2/2000 | Schweizer | 280/735 |
| 6,039,139 A | 3/2000 | Breed et al. | 280/735 |
| 6,095,553 A | 8/2000 | Chou et al. | 280/735 |
| 6,095,554 A | 8/2000 | Foo et al. | 280/735 |
| 6,220,627 B1 | 4/2001 | Stanley | 180/272 |
| 6,252,240 B1 | 6/2001 | Gillis et al. | 250/221 |
| 6,272,411 B1 | 8/2001 | Corrado et al. | 180/271 |
| 6,275,146 B1 | 8/2001 | Kithil et al. | 180/272 |
| 6,290,255 B1 | 9/2001 | Stanley et al. | 180/271 |
| 6,292,719 B1 | 9/2001 | Seto et al. | 340/435 |
| 6,302,438 B1 | 10/2001 | Stopper et al. | 280/735 |
| 6,329,914 B1 | 12/2001 | Shieh et al. | 180/271 |

OTHER PUBLICATIONS

"Vehicle Occupant Position Sensing", D. Breed, W. DuVall and V. Castelli, SAE Paper No. 940527, Feb., 1994.

"Learned Classification of Sonar Targets Using a Massively Parallel Network", R.P. Gorman and T.J. Sejnowski, IEEE Transactions on Acoustics, Speech and Signal Processing, vol. 36, No. 7, Jul. 1988.

"Analysis of Hidden Units in a Layered Network Trained to Classify Sonar Targets", R.P. Gorman and T.J. Sejnowski, Neural Networks, vol. 1, pp. 75–89, 1988.

* cited by examiner

TELEMATICS SYSTEM

CROSS REFERENCE TO RELATED APPLICATIONS

This application is a continuation-in-part of U.S. patent application Ser. No. 09/753,186 filed Jan. 2, 2001 which in turn is a continuation-in-part of U.S. patent application Ser. No. 09/137,918 filed Aug. 20, 1998, now U.S. Pat. No. 6,175,787, which in turn is a continuation-in-part of U.S. patent application Ser. No. 08/476,077 filed Jun. 7, 1995, now U.S. Pat. No. 5,809,437.

This application is a continuation-in-part of U.S. patent application Ser. No. 10/079,065 filed Feb. 19, 2002 which in turn is a continuation-in-part of U.S. patent application Ser. No. 09/765,558 filed Jan. 19, 2001, which claims priority under 35 U.S.C. §119(e) of U.S. provisional patent application Ser. No. 60/231,378 filed Sep. 8, 2000.

This application claims priority under 35 U.S.C. §119(e) of U.S. provisional patent application Ser. No. 60/269,415 filed Feb. 16, 2001, U.S. provisional patent application Ser. No. 60/291,511 filed May 16, 2001 and U.S. provisional patent application Ser. No. 60/304,013 filed Jul. 9, 2001 through U.S. patent application Ser. No. 10/079,065 filed Feb. 19, 2002.

This application is a continuation-in-part of U.S. patent application Ser. No. 10/114,533 filed Apr. 2, 2002 which in turn is a continuation-in-part of U.S. patent application Ser. No. 10/058,706 filed Jan. 28, 2002 which in turn is:

1) a continuation-in-part of U.S. patent application Ser. No. 09/891,432 filed Jun. 26, 2001 which in turn is a continuation-in-part of U.S. patent application Ser. No. 09/838,920 filed Apr. 20, 2001 which in turn is a continuation-in-part of U.S. patent application Ser. No. 09/563,556 filed May 3, 2000 which is a continuation-in-part of U S. patent application Ser. No. 09/437,535 filed Nov. 10, 1999 which in turn is a continuation-in-part of U.S. patent application Ser. No. 09/047,703 filed Mar. 25, 1998, now U.S. Pat. No. 6,039,139, which in turn is:
   a) a continuation-in-part of U.S. patent application Ser. No. 08/640,068 filed Apr. 30, 1996, now U.S. Pat. No. 5,829,782, which in turn is a continuation of U.S. patent application Ser. No. 08/239,978 filed May 9, 1994, now abandoned, which in turn is a continuation-in-part of U.S. patent application Ser. No. 08/040,978 filed Mar. 31, 1993, now abandoned, which in turn is a continuation-in-part of U.S. patent application Ser. No. 07/878,571 filed May 5, 1992, now abandoned; and
   b) a continuation-in-part of U.S. patent application Ser. No. 08/905,876 filed Aug. 4, 1997, now U.S. Pat. No. 5,848,802 , which in turn is a continuation of U.S. patent application Ser. No. 08/505,036 filed Jul. 21, 1995, now U.S. Pat. No. 5,653,462, which in turn is a continuation of the 08/040,978 application which in turn is a continuation-in-part of the 07/878,571 application;
2) a continuation-in-part of U.S. patent application Ser. No. 09/639,299 filed Aug. 15, 2000 which is:
   (a) a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 21, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned;
   (b) a continuation-in-part of U.S. patent application Ser. No. 09/409,625 filed Oct. 1, 1999, now U.S. Pat. No. 6,270,116, which is a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 21, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned;
   (c) a continuation-in-part of U.S. patent application Ser. No. 09/448,337 filed Nov. 23, 1999, now U.S. Pat. No. 6,283,503, which is a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 25, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned; and
   (d) a continuation-in-part of U.S. patent application Ser. No. 09/448,338 filed Nov. 23, 1999, now U.S. Pat. No. 6,168,186, which is a continuation-in-part of U.S. patent application Ser. No. 08/905,877 filed Aug. 4, 1997, now U.S Pat No. 6,186,537; which is a continuation of U.S. patent application Ser. No. 08/505,036 filed Jul. 25, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned; and
3) a continuation-in-part of U.S. patent application Ser. No. 09/543,678 filed Apr. 7, 2000 which is a continuation-in-part of U.S. patent application Ser. No. 09/047,704 filed Mar. 25, 1998, now U.S. Pat. No. 6,116,638, which in turn is:
   a) a continuation-in-part of U.S. patent application Ser. No. 08/640,068 filed Apr. 30, 1996, now U.S. Pat. No. 5,829,782, which in turn is a continuation of U.S. patent application Ser. No. 08/239,978 filed May 9, 1994, now abandoned, which in turn is a continuation-in-part of U.S. patent application Ser. No. 08/040,978 filed Mar. 31, 1993, now abandoned, which in turn is a continuation-in-part of U.S. patent application Ser. No. 07/878,571 filed May 5, 1992, now abandoned; and
   b) a continuation-in-part of U.S. patent application Ser. No. 08/905,876 filed Aug. 4, 1997, now U.S. Pat. No. 5,848,802, which in turn is a continuation of U.S. patent application Ser. No. 08/505,036 filed Jul. 21, 1995, now U.S. Pat. No. 5,653,462, which in turn is a continuation of the 08/040,978 application which in turn is a continuation-in-part of the 07/878,571 application.

This application is also related to (in view of common subject matter), but does not claim priority from, U.S. patent application Ser. No. 09/084,641 filed May 26, 1998, now U.S. Pat. No. 5,901,978, U.S. patent application Ser. No. 09/562,994 filed May 1, 2000, now, U.S. Pat. No. 6,254,127, U.S. patent application Ser No. 09/891,665 filed Jun. 26, 2001, U.S. patent application Ser. No. 09/639,303 filed Aug. 16, 2000, and U.S. patent application Ser. No. 09/543,997 filed Apr. 6, 2000, now U.S. Pat. No. 6,234,520.

All of the above-mentioned patents and applications are incorporated by reference herein in their entirety as if they had each been set forth herein in full.

FIELD OF THE INVENTION

The present invention is related to methods and apparatus for sensing and determining the status of occupants in a vehicle prior to, during and/or after an accident or deployment of an airbag and transmitting data relating to the occupants to a remote facility such as an emergency response station.

The present invention also relates to methods and apparatus for diagnosing components in a vehicle and transmitting data relating to the diagnosis of the components in the vehicle and other information relating to the operating conditions of the vehicle.

BACKGROUND OF THE INVENTION

It is now generally recognized that it is important to monitor the occupancy of a passenger compartment of a vehicle. For example, U.S. Pat. No. 5,829,782 (Breed et al.) describes a vehicle interior monitoring system that utilizes pattern recognition techniques and wave-receiving sensors to obtain information about the occupancy of the passenger compartment and uses this information to affect the operation of one or more systems in the vehicle, including an occupant restraint device, an entertainment system, a heating and air-conditioning system, a vehicle communication system, a distress notification system, a light filtering system and a security system.

Of particular interest, Breed et al. mentions that the presence of a child in a rear facing child seat placed on the right front passenger seat may be detected as this has become an industry-wide concern to prevent deployment of an occupant restraint device in these situations. The U.S. automobile industry is continually searching for an easy, economical solution, which will prevent the deployment of the passenger side airbag if a rear facing child seat is present.

Another important aspect disclosed in Breed et al. relates to the operation of the cellular communications system in conjunction with the vehicle interior monitoring system. Vehicles can be provided with a standard cellular phone as well as the Global Positioning System (GPS), an automobile navigation or location system with an optional connection to a manned assistance facility. In the event of an accident, the phone may automatically call 911 for emergency assistance and report the exact position of the vehicle. If the vehicle also has a system as described below for monitoring each seat location, the number and perhaps the condition of the occupants could also be reported. In that way, the emergency service (EMS) would know what equipment and how many ambulances to send to the accident site. Moreover, a communication channel can be opened between the vehicle and a monitoring facility/emergency response facility or personnel to determine how badly people are injured, the number of occupants in the vehicle, and to enable directions to be provided to the occupant(s) of the vehicle to assist in any necessary first aid prior to arrival of the emergency assistance personnel.

Communications between a vehicle and a remote assistance facility are also important for the purpose of diagnosing problems with the vehicle and forecasting problems with the vehicle, called prognostics. Motor vehicles contain complex mechanical systems that are monitored and regulated by computer systems such as electronic control units (ECUs) and the like. Such ECUs monitor various components of the vehicle including engine performance, carburation, speed/acceleration control, transmission, exhaust gas recirculation (EGR), braking systems, etc. However, vehicles perform such monitoring typically only for the vehicle driver and without communication of any impending results, problems and/or vehicle malfunction to a remote site for troubleshooting, diagnosis or tracking for data mining.

In the past, systems that provide for remote monitoring did not provide for automated analysis and communication of problems or potential problems and recommendations to the driver. As a result, the vehicle driver or user is often left stranded, or irreparable damage occurs to the vehicle as a result of neglect or driving the vehicle without the user knowing the vehicle is malfunctioning until it is too late, such as low oil level and a malfunctioning warning light, fan belt about to fail, failing radiator hose etc.

In this regard, U.S. Pat. No. 5,400,018 (Scholl et al.) describes a system for relaying information from an off road work site relating to the status of a vehicle to a remote location over a communications data link. The information consists of fault codes generated by sensors and electronic control modules indicating that a failure has occurred rather than forecasting a failure. Bi-directional communications are described in that a request for additional information can be sent to the vehicle from the remote location with the vehicle responding and providing the requested information but no such communication takes place with the vehicle operator and not of an operator of a vehicle traveling on a road.

U.S. Pat. No. 5,754,965 (Hagenbuch) describes an apparatus for diagnosing the state of health of a vehicle and providing the operator of the vehicle with a substantially real-time indication of the efficiency of the vehicle in performing as assigned task with respect to a predetermined goal. A processor in the vehicle monitors sensors that provide information regarding the state of health of the vehicle and the amount of work the vehicle has done. The processor records information that describes events leading up to the occurrence of an anomaly for later analysis. The sensors are also used to prompt the operator to operate the vehicle at optimum efficiency.

U.S. Pat. No. 5,955,942 (Slifkin et al.) describes a method for monitoring events in vehicles in which electrical outputs representative of events in the vehicle are produced, the characteristics of one event are compared with the characteristics of other events accumulated over a given period of time and departures or variations of a given extent from the other characteristics are determined as an indication of a significant event. A warning is sent in response to the indication, including the position of the vehicle as determined by a global positioning system on the vehicle. For example, for use with a railroad car, a microprocessor responds to outputs of an accelerometer by comparing acceleration characteristics of one impact with accumulated acceleration characteristics of other impacts and determines departures of a given magnitude from the other characteristics as a failure indication which gives rise of a warning.

Preferred embodiments of the invention are described below and unless specifically noted, it is the applicants' intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention; it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

OBJECTS AND SUMMARY OF THE INVENTION

It is an object of the present invention is to provide a new and improved method and system for obtaining information about occupancy of a vehicle and conveying this information to remotely situated assistance personnel.

It is another object of the present invention is to provide a new and improved method and system for obtaining information about occupancy of a vehicle and conveying this information to remotely situated assistance personnel to optimize their response to a crash involving the vehicle and/or enable proper assistance to be rendered to the occupants after the crash.

It is another object of the present invention to provide a new and improved method and system for determining the presence of an object on a particular seat of a motor vehicle and conveying this information over a wireless data link system or cellular phone.

It is another object of the present invention to provide a new and improved method and system for determining the presence of an object on a particular seat of a motor vehicle and using this information to affect the operation of a wireless data link system or cellular phone.

It is still another object of the present invention to provide a new and improved method and system for determining the presence of and total number of occupants of a vehicle and, in the event of an accident, transmitting that information, as well as other information such as the condition of the occupants, to a receiver site remote from the vehicle.

It is yet another object of the present invention to provide a new and improved occupant sensor which determines the presence and health state of any occupants in the vehicle by analyzing sounds emanating from the passenger compartment and directing directed such sounds to a remote, manned site for consideration in dispatching response personnel.

Still another object of the present invention is to provide a new and improved vehicle monitoring system which provides a communications channel between the vehicle (possibly through microphones distributed throughout the vehicle) and a manned assistance facility to enable communications with the occupants after a crash or whenever the occupants are in need of assistance particularly when the communication is initiated from the remote facility in response to a condition that the operator may not knows exists (e.g., if the occupants are lost, then data forming maps as a navigational aid would be transmitted to the vehicle).

It is yet another object of the present invention to provide a new and improved method and system for diagnosing components in a vehicle and the operating status of the vehicle and alerting the vehicle's dealer, or another repair facility, via a telematics link that a component of the vehicle is functioning abnormally and may be in danger of failing.

It is still another object of the present invention to provide a new and improved method and apparatus for obtaining information about a vehicle system and components in the vehicle in conjunction with failure of the component or the vehicle and sending this information to the vehicle manufacturer.

Accordingly, to achieve at least one of these objects, a vehicle comprises an occupant sensing system for determining at least one property or characteristic of occupancy of the vehicle constituting information about the occupancy of the vehicle and a communications device coupled to the occupant sensing system and arranged to transmit the information about the occupancy of the vehicle. The communications device may comprise a cellular telephone system including an antenna or other similar communication-enabling device.

The occupant sensing system may include a plurality of the same of different sensors, for example, an image-obtaining sensor for obtaining images of the passenger compartment of the vehicle whereby the communications device transmits the images. If a crash sensor is provided for determining when the vehicle experiences a crash, the image-obtaining sensor may be designed to obtain images including the driver of the vehicle with the communications device being coupled to the crash sensor and arranged to transmit images of the passenger compartment just prior to the crash once the crash sensor has determined that the vehicle has experienced a crash, during the crash once the crash sensor has determined that the vehicle has experienced a crash and/or after the crash once the crash sensor has determined that the vehicle has experienced a crash.

The occupant sensing system may also include at least one motion sensor with the communications device being arranged to transmit information about any motion of occupants in the passenger compartment as part of the information about the occupancy of the vehicle. This would help to assess whether the occupants are conscious after a crash and mobile.

The occupant sensing system may also include an arrangement for determining the number of occupants in the vehicle with the communications device being arranged to transmit the number of occupants in the passenger compartment as part of the information about the occupancy of the vehicle. The arrangement may include receivers arranged to receive waves, energy or radiation from all of the seating locations in the passenger compartment and a processor arranged to determine the number of occupants in the passenger compartment from the received waves, energy or radiation. Waves, energy or radiation may be in the form of ultrasonic waves, electromagnetic waves, electric fields, capacitive fields and the like. The arrangement may also include heartbeat sensors, weight sensors associated with seats in the vehicle and/or chemical sensors.

The processor can be arranged to determine the condition of any occupants in the vehicle. When the occupant sensing system comprises receivers arranged to receive waves, energy or radiation from the passenger compartment, the processor can determine the condition of any occupants in the vehicle based on the received waves, energy or radiation. In this case, the communications device transmits the condition of the occupants as part of the information about the occupancy of the vehicle.

In another embodiment, at least one vehicle sensor is provided, each sensing a state of the vehicle or a state of a component of the vehicle. The communications device is coupled, wired or wirelessly, directly or indirectly, to each vehicle sensor and transmits the state of the vehicle or the state of the component of the vehicle.

One or more environment sensors can be provided, each sensing a state of the environment around the vehicle. The communications device is coupled, wired or wirelessly, directly or indirectly, to each environment sensor and transmits information about the environment of the vehicle. The environment sensor may be an optical or other image-obtaining sensor for obtaining images of the environment around the vehicle. The environment sensor can also be a road condition sensor, an ambient temperature sensor, an internal temperature sensor, a clock, and a location sensor for sensing the location of objects around the vehicle such as the sun, lights and other vehicles, a sensor for sensing the presence of rain, snow, sleet and fog, the presence and location of potholes, ice and snow cover, the presence and status of the road and traffic, sensors which obtain images of the environment surrounding the vehicle, blind spot detectors which provides data on the blind spot of the driver, automatic cruise control sensors that can provide images of vehicles in front of the vehicle and radar devices which provide the position of other vehicles and objects relative to the vehicle.

When a crash sensor for determining when the vehicle experiences a crash is coupled to the system in accordance with the invention, the communications device being coupled to the crash sensor and arranged to transmit information about the occupancy of the vehicle upon the crash sensor determining that the vehicle has experienced a crash.

Optionally, a memory unit is coupled to the occupant sensing system and the communications device and receives the information about the occupancy of the vehicle from the occupant sensing system and stores the information. The communications device interrogates the memory unit to obtain the stored information about the occupancy of the vehicle to enable transmission thereof.

A method for monitoring and providing assistance to a vehicle in accordance with the invention comprises the steps of determining at least one property or characteristic of occupancy of the vehicle constituting information about the occupancy of the vehicle and transmitting the information about the occupancy of the vehicle to a remote location. Additional enhancements of the method include obtaining images of the passenger compartment of the vehicle and transmitting the images of the passenger compartment after the crash. It is possible to determine when the vehicle experiences a crash in which case, images including the driver of the vehicle just prior to the crash are obtained and transmitted once it has determined that the vehicle has experienced a crash.

Determining the property or characteristic of occupancy of the vehicle may entail determining any motion in the passenger compartment of the vehicle, whereby information about any motion of occupants in the passenger compartment is transmitted as part of the information about the occupancy of the vehicle. In addition to or instead of motion, determining the property or characteristic of occupancy of the vehicle may entail determining the number of occupants in the passenger compartment, the number of occupants in the passenger compartment being transmitted as part of the information about the occupancy of the vehicle. To this end, the number of occupants in the vehicle can be determined by receiving waves, energy or radiation from all of the seating locations in the passenger compartment and determining the number of occupants in the passenger compartment from the received waves, energy or radiation. The number of occupants in the vehicle can also be determined by arranging at least one heartbeat sensor in the vehicle to detect the presence of heartbeats in the vehicle such that the number of occupants is determinable from the number of detected heartbeats. The number of occupants in the vehicle can also be determined by arranging at least one weight sensor system in the vehicle to detect the weight and/or weight distribution applied to the seats such that the number of occupants is determinable from the detected weight and/or weight distribution. Further, the number of occupants in the vehicle can be determined by arranging at least one temperature sensor to measure temperature in the passenger compartment whereby the number of occupants is determinable from the measured temperature in the passenger compartment. The number of occupants in the vehicle can also be determined by arranging at least one seatbelt buckle switch to provide an indication of the seatbelt being buckled whereby the number of occupants is determinable from the buckled state of the seatbelts. The number of occupants in the vehicle can also be determined by arranging at least one chemical sensor to provide an indication of the presence of a chemical indicative of the presence of an occupant whereby the number of occupants is determinable from the indication of the presence of the chemical indicative of the presence of an occupant.

The condition of any occupants in the vehicle can be determined based on the received waves, energy or radiation, the condition of the occupants being transmitted as part of the information about the occupancy of the vehicle. The number of human occupants can also be determined as the property or characteristic of occupancy of the vehicle.

The method can also include the steps of sensing a state of the vehicle or a state of a component of the vehicle and transmitting the state of the vehicle or the state of the component of the vehicle. Also, a state of the environment around the vehicle can be sensed and information about the environment of the vehicle transmitted.

When it is determined that the vehicle experiences a crash, information can be transmitted intermediately thereafter. Optionally, a memory unit is provided to receive the information about the occupancy of the vehicle and store the information The memory unit is interrogated, e.g., after a crash, to obtain the stored information about the occupancy of the vehicle to enable transmission thereof.

Another method for monitoring and providing assistance to a vehicle in accordance with the invention comprises the steps of determining at least one property or characteristic of occupancy of the vehicle constituting information about the occupancy of the vehicle, determining at least one state of the vehicle or of a component of the vehicle constituting information about the operation of the vehicle, and selectively transmitting the information about the occupancy of the vehicle and the information about the operation of the vehicle. Thus, different recipients could receive different information, whatever information is pertinent and relevant to that recipient. Thus, selective transmission of information may entail addressing a transmission of information about the occupancy of the vehicle differently than a transmission of information about the operation of the vehicle.

In another embodiment of this method, images of the passenger compartment of the vehicle are obtained and transmitted after the crash. The images ideally include the driver of the vehicle. The images of the passenger compartment just prior to the crash can be transmitted once it has determined that the vehicle has experienced a crash. This would assist in accident reconstruction and placement of fault and liability.

The determination of a property or characteristic of occupancy of the vehicle may entail determining any motion in the passenger compartment of the vehicle, determining the number of occupants in the passenger compartment and/or determining the number of human occupants in the passenger compartment.

The determination of the number of occupants in the vehicle may be performed in a variety of ways. For example, by receiving waves, energy or radiation from all of the seating locations in the passenger compartment and determining the number of occupants in the passenger compartment from the received waves, energy or radiation, by arranging at least one heartbeat sensor in the vehicle to detect the presence of heartbeats in the vehicle such that the number of occupants is determinable from the number of detected heartbeats, by arranging at least one weight sensor system in the vehicle to detect the weight and/or weight distribution applied to the seats such that the number of occupants is determinable from the detected weight and/or weight distribution, by arranging at least one temperature sensor to measure temperature in the passenger compartment whereby the number of occupants is determinable from the measured temperature in the passenger compartment, by arranging at least one seatbelt buckle switch to provide an indication of the seatbelt being buckled whereby the number of occupants is determinable from the buckled state of the seatbelts, and/or by arranging at least one chemical sensor to provide an indication of the presence of a chemical indicative of the presence of an occupant whereby the number of occupants is determinable from the indication of the presence of the chemical indicative of the presence of an occupant.

The determination of a property of characteristic of occupancy of the vehicle may entail determining the condition of any occupants in the vehicle based on the received waves, energy or radiation, the condition of the occupants being transmitted as part of the information about the occupancy of the vehicle.

The method can also include the steps of sensing a state of the vehicle or a state of a component of the vehicle and transmitting the state of the vehicle or the state of the component of the vehicle. Also, a state of the environment around the vehicle can be sensed and information about the environment of the vehicle transmitted.

When it is determined that the vehicle experiences a crash, information can be transmitted immediately thereafter. Optionally, a memory unit is provided to receive the information about the occupancy of the vehicle and store the information. The memory unit is interrogated, e.g., after a crash, to obtain the stored information about the occupancy of the vehicle to enable transmission thereof.

BRIEF DESCRIPTION OF THE DRAWINGS

The following drawings are illustrative of embodiments of the system developed or adapted using the teachings of this invention and are not meant to limit the scope of the invention as encompassed by the claims.

DETAILED DESCRIPTION OF THE INVENTION

Figure 1:
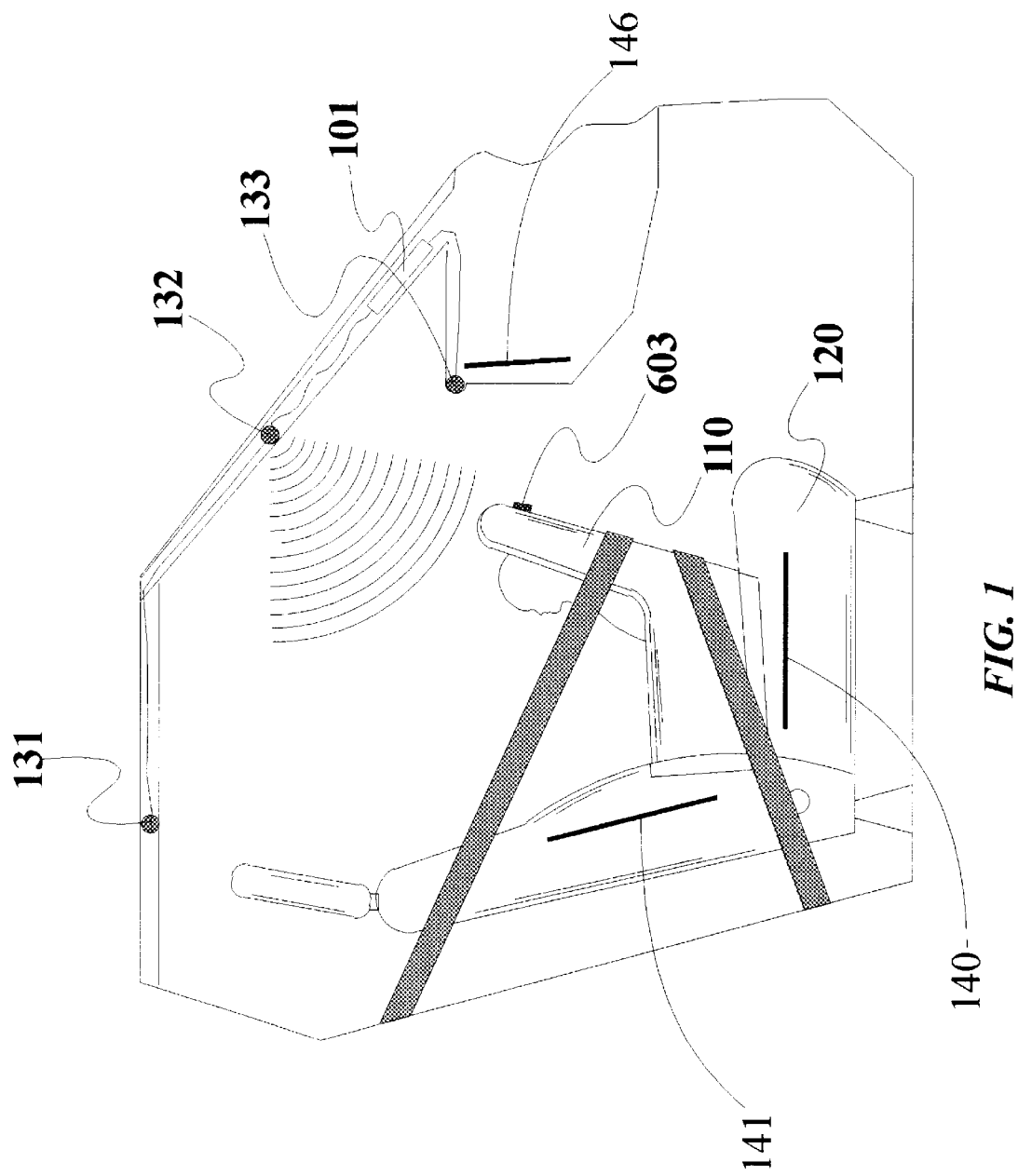
FIG. 1 is a side view with parts cutaway and removed of a vehicle showing the passenger compartment containing a rear facing child seat on the front passenger seat and a preferred mounting location for an occupant and rear facing child seat presence detector.

Referring to the accompanying drawings wherein the same reference numerals refer to the same or similar elements, FIG. 1 is a side view, with parts cutaway and removed of a vehicle showing the passenger compartment containing a rear facing child seat 110 on a front passenger seat 120 and one mounting location for a first embodiment of a vehicle interior monitoring system in accordance with the invention. The interior monitoring system is capable of detecting the presence of an object, determining the type of object, determining the location of the object, and/or determining another property or characteristic of the object. A property of the object could be the orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out of position relative to the airbag.

In this embodiment, six transducers 131, 132 133, 140, 141 and 146 are used, although any number of transducers may be used. Each transducer 131, 132, 133, 140, 141, 146 may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

Such transducers or receivers may be of the type which emit or receive a continuous signal, a time varying signal (such as a capacitor or electric field sensor) or a spacial varying signal such as in a scanning system. One particular type of radiation-receiving receiver for use in the invention is a receiver capable of receiving electromagnetic waves.

When ultrasonic energy is used, transducer 132 can be used as a transmitter and transducers 131, 133 as receivers. Naturally, other combinations can be used such as where all transducers are transceivers (transmitters and receivers). For example, transducer 132 can be constructed to transmit ultrasonic energy toward the front passenger seat, which is modified, in this case by the occupying item of the passenger seat, i.e., the rear facing child seat 110, and the modified waves are received by the transducers 131 and 133, for example. A more common arrangement is where transducers 131, 132 and 133 are all transceivers. Modification of the ultrasonic energy may constitute reflection of the ultrasonic energy as the ultrasonic energy is reflected back by the occupying item of the seat. The waves received by transducers 131 and 133 vary with time depending on the shape of the object occupying the passenger seat, in this case the rear facing child seat 110. Each object will reflect back waves having a different pattern. Also, the pattern of waves received by transducer 131 will differ from the pattern received by transducer 133 in view of its different mounting location. This difference generally permits the determination of location of the reflecting surface (i.e., the rear facing child seat 110) through triangulation. Through the use of two transducers 131, 133, a sort of stereographic image is received by the two transducers and recorded for analysis by processor 101, which is coupled to the transducers 131, 132, 133. This image will differ for each object that is placed on the vehicle seat and it will also change for each position of a particular object and for each position of the vehicle seat. Elements 131, 132, 133, although described as transducers, are representative of any type of component used in a wave-based analysis technique.

Mention is made above of the use of wave-type sensors as the transducers 131, 132, 133 as well as electric field sensors. Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between/near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus for the purposes of this invention, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Pat. No. 5,702,634.

An electromagnetic field disturbed or emitted by a passenger in the case of an electromagnetic wave sensor, for example, and the electric field sensor of Kithil, for example, are in many ways similar and equivalent for the purposes of this invention. The electromagnetic wave sensor is an actual electromagnetic wave sensor by definition because they sense parameters of a wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5–7): "The proximity sensor 12 each function by creating an electrostatic field between oscillator input loop 54 and detector output loop 56, which is affected by presence of a person near by, as a result of capacitive coupling, . . . "). It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/near the plates of the capacitor.

Kithil declares that his capacitance sensor uses a static electric field. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasistatic electric field in the space between the capacitor plates, and a detector to reveal an informative change of the sensor capacitance caused by the presence of an occupant (see FIG. 7 and its description). In this case, the system becomes a "wave sensor" in the sense that it starts generating actual time-varying electric field that certainly originates electromagnetic waves according to the definition above. That is, Kithil's sensor can be treated as a wave sensor regardless of the shape of the electric field that it creates, a beam or a spread shape.

As follows from the Kithil patent, the capacitor sensor is likely a parametric system where the capacitance of the sensor is controlled by influence of the passenger body. This influence is transferred by means of the near electromagnetic field (i.e., the wave-like process) coupling the capacitor electrodes and the body It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares the coupling is due to a static electric field, such a situation is not realized in his system because an alternating electromagnetic field ("quasi-wave") exists in the system due to the oscillator. Thus, his sensor is actually a wave sensor, that is, it is sensitive to a change of a wave field in the vehicle compartment This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. Physics. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam-type electromagnetic wave sensor.

For ultrasonic systems, the "image" recorded from each ultrasonic transducer/receiver, is actually a time series of digitized data of the amplitude of the received signal versus time. Since there are two receivers, two time series are obtained which are processed by the processor 101. The processor 101 may include electronic circuitry and associated, embedded software. Processor 101 constitutes one form of generating means in accordance with the invention which generates information about the occupancy of the passenger compartment based on the waves received by the transducers 131,132,133.

When different objects are placed on the front passenger seat, the two images from transducers 131,133, for example, are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see U.S. Pat. No. 5,943,295 to Varga et. al., which is incorporated herein by reference.

The determination of these rules is important to the pattern recognition techniques used in this invention. In general, three approaches have been useful, artificial intelligence, fuzzy logic and artificial neural networks (including cellular and modular or combination neural networks and support vector machines) (although additional types of pattern recognition techniques may also be used, such as sensor fusion). In some implementations of this invention, such as the determination that there is an object in the path of a closing window as described below, the rules are sufficiently obvious that a trained researcher can sometimes look at the returned signals and devise a simple algorithm to make the required determinations. In others, such as the determination of the presence of a rear facing child seat or of an occupant, artificial neural networks are used to determine the rules. One such set of neural network software for determining the pattern recognition rules is available from the NeuralWare Corporation of Pittsburgh, Pa.

The system used in a preferred implementation of this invention for the determination of the presence of a rear facing child seat, of an occupant or of an empty seat is the artificial neural network which is also commonly referred to as a trained neural network. In this case, the network operates on the two returned signals as sensed by transducers 131 and 133. Through a training session, the system is taught to differentiate between the three cases. This is done by conducting a large number of experiments where all possible child seats are placed in all possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 131,133 are associated with the identification of the occupant in the seat or the empty seat and information about the occupant such as its orientation if it is a child seat and/or position. Data sets are formed from the returned signals and the identification and information about the occupant or the absence of an occupant. The data sets are input into a neural network-generating program which creates a trained neural network which can, upon receiving input of two returned signals from the transducers 131,133, provide an output of the identification and information about the occupant most likely situated in the seat or ascertained the existence of an empty seat. Sometimes as many as 1,000,000 such experiments are run before the neural network is sufficiently trained so that it can differentiate among the three cases and output the correct decision with a very high probability. Of course, it must be realized that a neural network can also be trained to differentiate among additional cases, e.g., a forward facing child seat.

Once the network is determined, it is possible to examine the result using tools supplied by NeuralWare or International Scientific Research, for example, to determine the rules that were finally arrived at by the trial and error techniques. In that case, the rules can then be programmed into a microprocessor resulting in a fuzzy logic or other rule based system. Alternately, a neural computer, or cellular neural network, can be used to implement the net directly. In either case, the implementation can be carried out by those skilled in the art of pattern recognition. If a microprocessor is used, a memory device is also required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

Electromagnetic energy based occupant sensors exist that use many portions of the electromagnetic spectrum. A system based on the ultraviolet, visible or infrared portions of the spectrum generally operate with a transmitter and a receiver of reflected radiation. The receiver may be a camera or a photo detector such as a pin or avalanche diode as described in detail in above-referenced patents and patent applications. At other frequencies, the absorption of the electromagnetic energy is primarily and at still other frequencies the capacitance or electric field influencing effects are used. Generally, the human body will reflect, scatter, absorb or transmit electromagnetic energy in various degrees depending on the frequency of the electromagnetic waves. All such occupant sensors are included herein.

In the embodiment wherein electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 131, 132, 133 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupants of the vehicle prior to the accident. In this manner, it can be ascertained whether the driver was falling asleep, talking on the phone, etc.

A memory device for storing the images of the passenger compartment, and also for receiving and storing any of the other information, parameters and variables relating to the vehicle or occupancy of the vehicle, may be in the form a standardized "black box" (instead of or in addition to a memory part in a processor 101). The IEEE Standards Association is currently beginning to develop an international standard for motor vehicle event data recorders. The information stored in the black box and/or memory unit in the processor 101, can include the images of the interior of the passenger compartment as well as the number of occupants and the health state of the occupants. The black box would preferably be tamper-proof and crash-proof and enable retrieval of the information after a crash.

Figure 2:
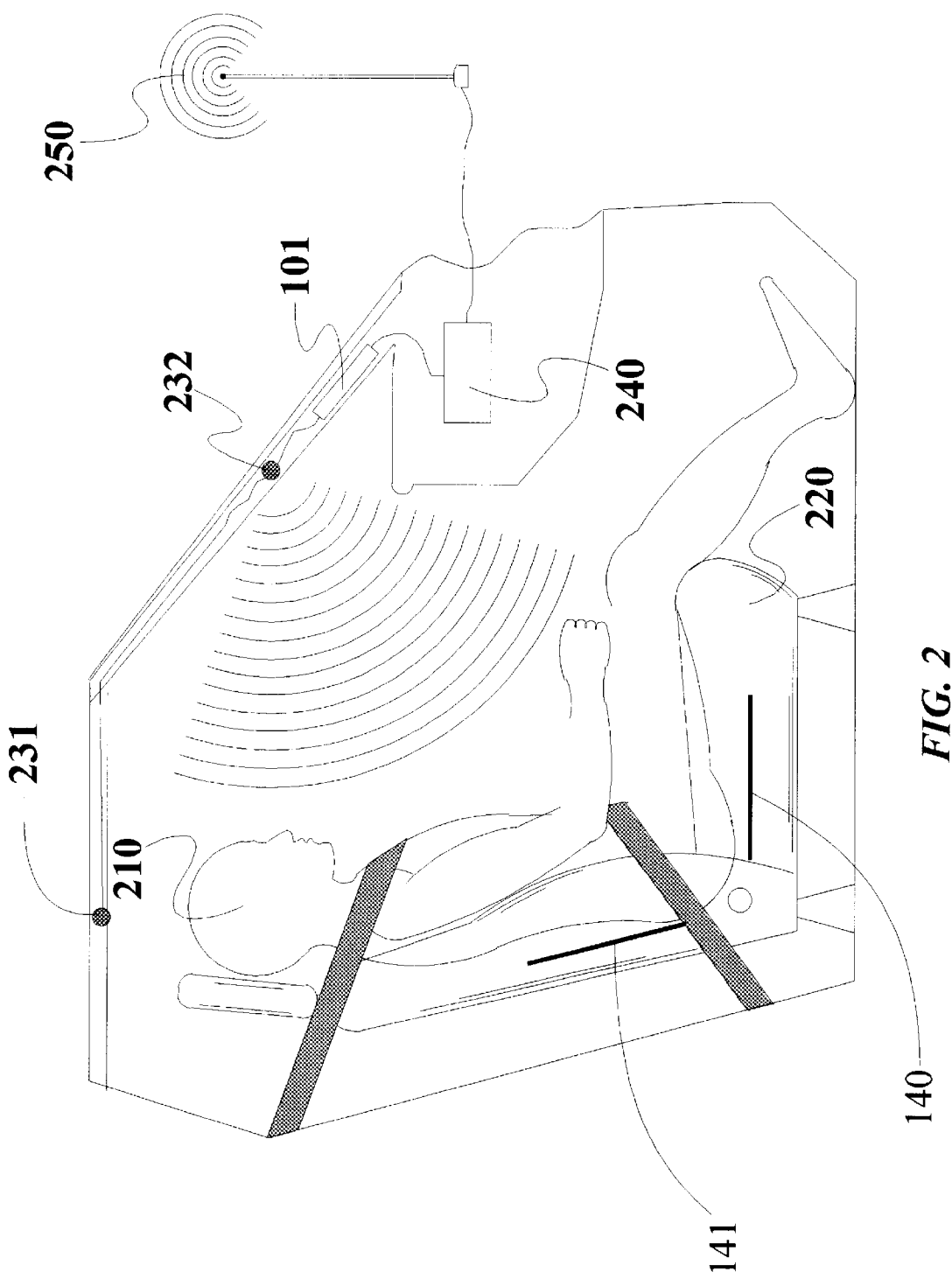
FIG. 2 is a side view with parts cutaway and removed showing schematically the interface between the vehicle interior monitoring system of this invention and the vehicle cellular communication system.

FIG. 2 shows schematically the interface between a vehicle interior monitoring system in accordance with the invention and the vehicle's cellular or other telematics communication system. An adult occupant 210 is shown sitting on the front passenger seat 220 and four transducers 231, 232, 140 and 141 are used to determine the presence (or absence) of the occupant on that seat 220. One of the transducers 232 in this case acts as both a transmitter and receiver while transducer 231 acts only as a receiver. Alternately, transducer 231 could serve as both a transmitter and receiver or the transmitting function could be alternated between the two devices. Also, in many cases more that two transmitters and receivers are used and in still other cases other types of sensors, such as electric field, capacitance, self-tuning antennas (collectively represented by 140 and 141), weight, seatbelt, heartbeat, motion and seat position sensors, are also used in combination with the radiation sensors.

For a general object, transducers 231, 232, 140, 141 can also be used to determine the type of object, determine the location of the object, and/or determine another property or characteristic of the object. A property of the object could be the orientation of a child seat, the velocity of an adult and the like. For example, the transducers 231, 232, 140, 141 can be designed to enable a determination that an object is present on the seat, that the object is a child seat and that the child seat is rear-facing.

The transducers 231 and 232 are attached to the vehicle buried in the A-pillar trim, where their presence can be disguised, and are connected to processor 101 that may also be hidden in the trim as shown (this being a non-limiting position for the processor 101). The A-pillar is the roof support pillar that is closest to the front of the vehicle and which, in addition to supporting the roof, also supports the front windshield and the front door. Other mounting locations can also be used. For example, transducers 231, 232 can be mounted inside the seat (along with or in place of transducers 140 and 141), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in the above-referenced patent applications and all of these mounting locations are contemplated for use with the transducers described herein.

The cellular phone or other communications system 240 outputs to an antenna 250A. The transducers 231, 232, 140 and 141 in conjunction with the pattern recognition hardware and software, which is implemented in processor 101 and is packaged on a printed circuit board or flex circuit along with the transducers 231 and 232, determine the presence of an occupant within a few seconds after the vehicle is started, or within a few seconds after the door is closed. Similar systems located to monitor the remaining seats in the vehicle, also determine the presence of occupants at the other seating locations and this result is stored in the computer memory which is part of each monitoring system processor 101.

Periodically and in particular in the event of an accident, the electronic system associated with the cellular phone system 240 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials the EMS operator (such as 911 or through a telematics service such as OnStar™) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating locations or at multiple seating locations with a provision being made to eliminate repetitive count of occupants. A determination can also be made using the transducers as to whether the life forms are humans, or more specifically, adults, child in child seas, etc. As noted above and below, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number and position of transducers and training of the pattern recognition algorithm.

In addition to the use of transducers to determine the presence and location of occupants in a vehicle, other sensors could also be used. For example, a heartbeat sensor which determines the number and presence of heartbeats can also be arranged in the vehicle, which would thus also determine the number of occupants as the number of occupants would be equal to the number of heartbeats. Conventional heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat, if such a human occupant is present. The output of the heartbeat sensor is input to the processor of the interior monitoring system. One heartbeat sensor for use in the invention may be of the types as disclosed in McEwan (U.S. Pat. Nos. 5,573,012 and 5,766, 208 which are incorporated herein in their entirety by reference). The heartbeat sensor can be positioned at any convenient position relative to the seats where occupancy is being monitored. A preferred location is within the vehicle seatback.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system heretofore is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Pat. No. 5,361, 070, which is incorporated herein by reference), as well as many other patents by the same inventor. Motion sensing is accomplished by monitoring a particular range from the sensor as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency is also possible Additionally, multiple MIR sensors can be used when high speed tracking of the motion of an occupant during a crash is required since they can be individually pulsed without interfering with each through time division multiplexing.

An alternative way to determine motion of the occupant (s) is to monitor the weight distribution of the occupant whereby changes in weight distribution after an accident would be highly suggestive of movement of the occupant. A system for determining the weight distribution of the occupants could be integrated or otherwise arranged in the seats 120, 220 of the vehicle and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth. Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar™).

Figure 3:
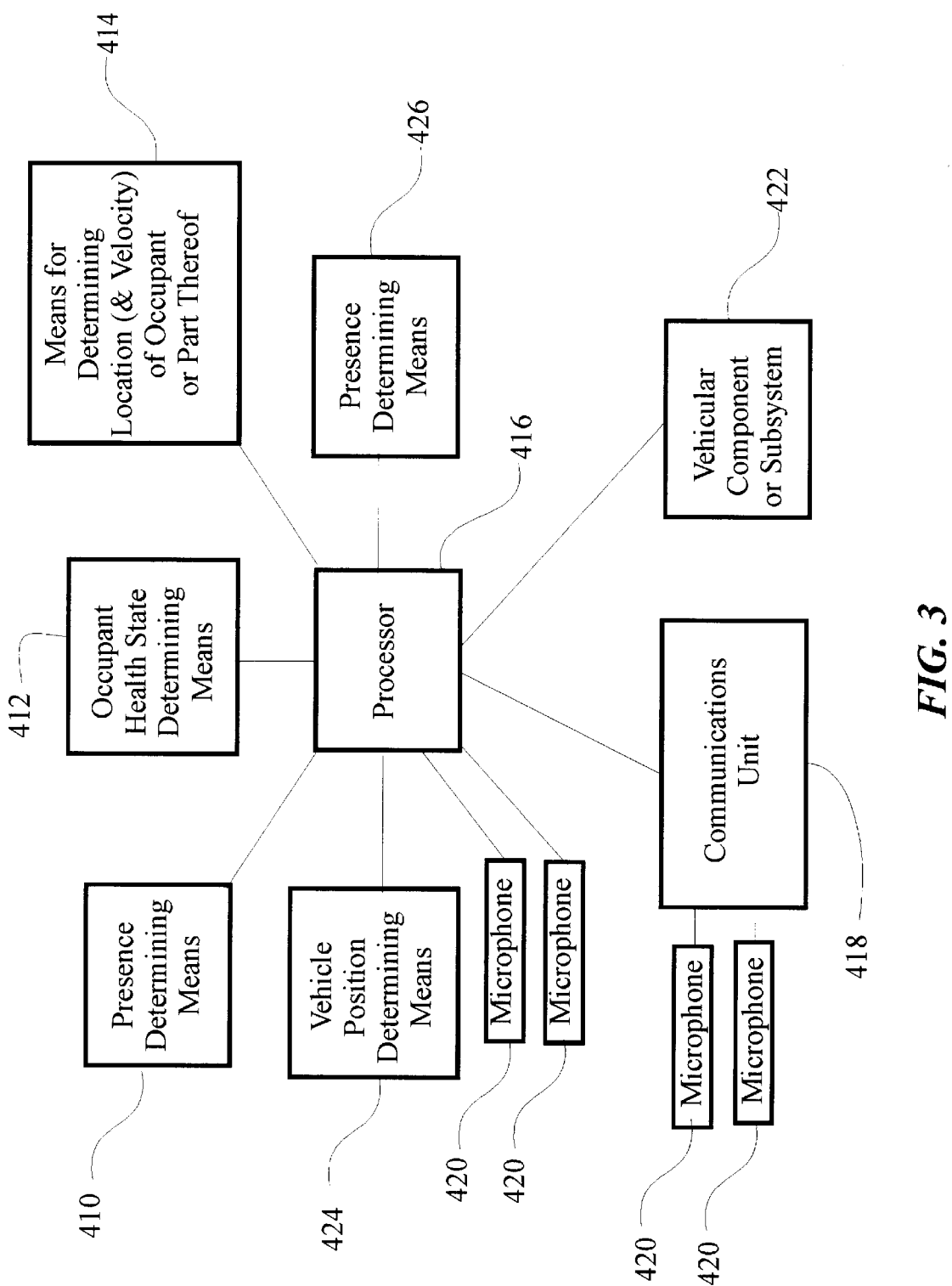
FIG. 3 is a diagram of one exemplifying embodiment of the invention.

FIG. 3 shows a schematic diagram of an embodiment of the invention including a system for determining the presence and health state of any occupants of the vehicle and a telecommunications link. This embodiment includes means for determining the presence of any occupants 410 which may take the form of a heartbeat sensor or motion sensor as described above and means for determining the health state of any occupants 412. The latter means may be integrated into the means for determining the presence of any occupants, i.e., one and the same component, or separate therefrom. Further, means for determining the location, and optionally velocity, of the occupants or one or more parts thereof 414 are provided and may be any conventional occupant position sensor or preferably, one of the occupant position sensors as described herein (e.g., those utilizing waves electromagnetic radiation or electric fields) or as described in the current assignee's patents and patent applications referenced above.

A processor 416 is coupled to the presence determining means 410, the health state determining means 412 and the location determining means 414. A communications unit 418 is coupled to the processor 416. The processor 416 and/or communications unit 418 can also be coupled to microphones 420 that can be distributed throughout the vehicle and include voice-processing circuitry to enable the occupant(s) to effect vocal control of the processor 416, communications unit 418 or any coupled component or oral communications via the communications unit 418. The processor 416 is also coupled to another vehicular system, component or subsystem 422 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 424 could be coupled to the processor 416 and provides an indication of the absolute position of the vehicle, preferably using satellite-based positioning technology (e.g., a GPS receiver).

In normal use (other than after a crash), the presence determining means 410 determine whether any human occupants are present, i.e., adults or children, and the location determining means 414 determine the occupant's location The processor 416 receives signals representative of the presence of occupants and their location and determines whether the vehicular system, component or subsystem 422 can be modified to optimize its operation for the specific arrangement of occupants. For example, if the processor 416 determines that only the front seats in the vehicle are occupied, it could control the heating system to provide heat only through vents situated to provide heat for the front-seated occupants.

Another possible vehicular system, component or subsystem is a navigational aid, i.e., a route display or map. In this case, the position of the vehicle as determined by the positioning system 424 is conveyed through processor 416 to the communications unit 418 to a remote facility and a map is transmitted from this facility to the vehicle to be displayed on the route display. If directions are needed, a request for the same could be entered into an input unit 426 associated with the processor 416 and transmitted to the facility. Data for the display map and/or vocal instructions could be transmitted from this facility to the vehicle.

Moreover, using this embodiment, it is possible to remotely monitor the health state of the occupants in the vehicle and most importantly, the driver. The health state determining means 412 may be used to detect whether the driver's breathing is erratic or indicative of a state in which the driver is dozing off. The health state determining means 412 could also include a breath-analyzer to determine whether the driver's breath contains alcohol. In this case, the health state of the driver is relayed through the processor 416 and the communications unit 418 to the remote facility and appropriate action can be taken. For example, it would be possible to transmit a command to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 422.

In use after a crash, the presence determining means 410, health state determining means 412 and location determining means 414 can obtain readings from the passenger compartment and direct such readings to the processor 416. The processor 416 analyzes the information and directs or controls the transmission of the information about the occupant(s) to a remote, manned facility. Such information would include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making noise. Moreover, the communications link through the communications unit 418 can be activated immediately after the crash to enable personnel at the remote facility to initiate communications with the vehicle.

Figure 4:
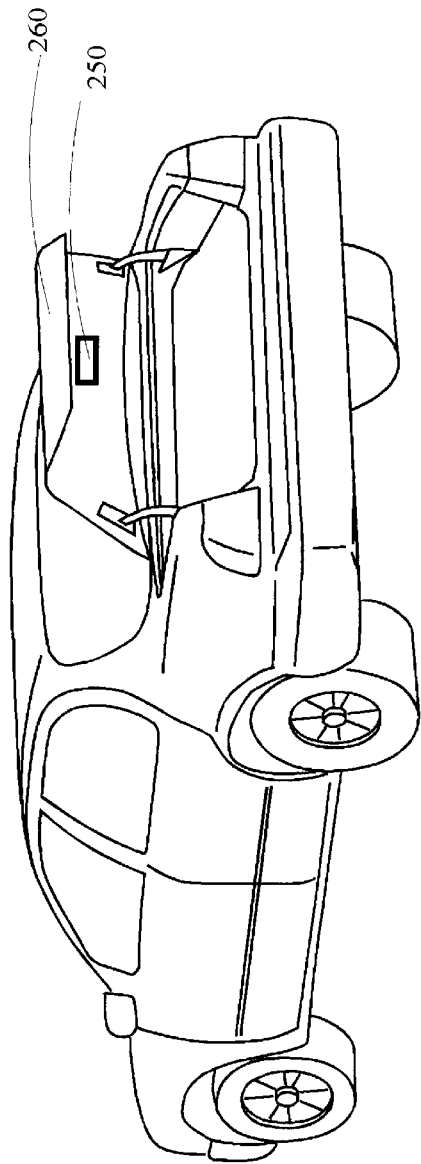
FIG. 4 is a perspective view of a carbon dioxide SAW sensor for mounting in the trunk lid for monitoring the inside of the trunk for detecting trapped children or animals.
Figure 4A:
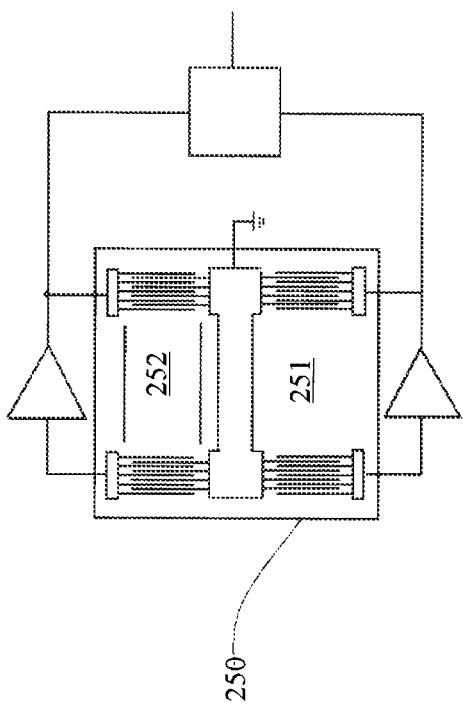
FIG. 4A is a detailed view of the SAW carbon dioxide sensor of FIG. 4.

An occupant sensing system can also involve sensing for the presence of a living occupant in a trunk of a vehicle or in a closed vehicle, for example, when a child is inadvertently left in the vehicle or enters the trunk and the trunk closes. To this end, a SAW-based chemical sensor 250 is illustrated in FIG. 4A for mounting in a vehicle trunk as illustrated in FIG. 4. The chemical sensor 250 is designed to measure carbon dioxide concentration through the mass loading effects as described in U.S. Pat. No. 4,895,017, which is incorporated by reference herein, with a polymer coating selected that is sensitive to carbon dioxide. The speed of the surface acoustic wave is a function of the carbon dioxide level in the atmosphere. Section 252 of the chemical sensor 250 contains a coating of such a polymer and the acoustic velocity in this section is a measure of the carbon dioxide concentration. Temperature effects are eliminated through a comparison of the sonic velocities in sections 251 and 252 as described above.

Thus, when trunk lid 260 is closed and a source of carbon dioxide such as a child or animal is trapped within the trunk, the chemical sensor 250 will provide information indicating the presence of the carbon dioxide producing object to the interrogator which can then release the trunk lock permitting trunk to automatically open. In this manner, the problem of children and animals suffocating in closed trunks is eliminated. Alternately, information that a person or animal is trapped in a trunk can be sent by the telematics system to law enforcement authorities or other location remote from the vehicle.

A similar device can be distributed at various locations within the passenger compartment of vehicle along with a combined temperature sensor. If the car has been left with a child or other animal while owner is shopping, for example, and if the temperature rises within the vehicle to an unsafe level or, alternately, if the temperature drops below an unsafe level, then the vehicle can be signaled to take appropriate action which may involve opening the windows or starting the vehicle with either air conditioning or heating as appropriate. Alternately, information that a person or animal is trapped within a vehicle can be sent by the telematics system to law enforcement authorities or other location remote from the vehicle. Thus, through these simple wireless powerless sensors, the problem of suffocation either from lack of oxygen or death from excessive heat or cold can all be solved in a simple, low-cost manner through using an interrogator as disclosed in the current assignee's U.S. patent application Ser. No. 10/079,065 incorporated by reference herein in its entirety.

Additionally, a sensitive layer on a SAW can be made to be sensitive to other chemicals such as water vapor for humidity control or alcohol for drunk driving control. Similarly, the sensitive layer can be designed to be sensitive to carbon monoxide thereby preventing carbon monoxide poisoning. Many other chemicals can be sensed for specific applications such as to check for chemical leaks in commercial vehicles, for example. Whenever such a sensor system determines that a dangerous situation is developing, an alarm can be sounded and/or the situation can be automatically communicated to an off vehicle location through telematics, a cell phone such as a 911 call, the Internet or though a subscriber service such as OnStar™.

Described above is a system for determining the status of occupants in a vehicle, and in the event of an accident or at any other appropriate time, transmitting the status of the occupants, and optionally additional information, via a communications channel or link to a remote monitoring facility. In addition to the status of the occupant, it is also important to be able to analyze the operating conditions of the vehicle and detect when a component of the vehicle is about to fail. By notifying the driver of the impending failure of the component, appropriate corrective action can be taken to avoid such failure.

The operating conditions of the vehicle can also be transmitted along with the status of the occupants to a remote monitoring facility. The operating conditions of the vehicle include whether the motor is running and the vehicle is moving. Thus, in a general embodiment in which information on both occupancy of the vehicle and the operating conditions of the vehicle are transmitted, one or more properties or characteristics of occupancy of the vehicle are determined, such constituting information about the occupancy of the vehicle, and one or more states of the vehicle or of a component of the vehicle is determined, such constituting information about the operation of the vehicle. The information about the occupancy of the vehicle and operation of the vehicle are selectively transmitted, possibly the information about occupancy to an emergency response center and the information about the vehicle to a dealer or repair facility.

Figure 5:
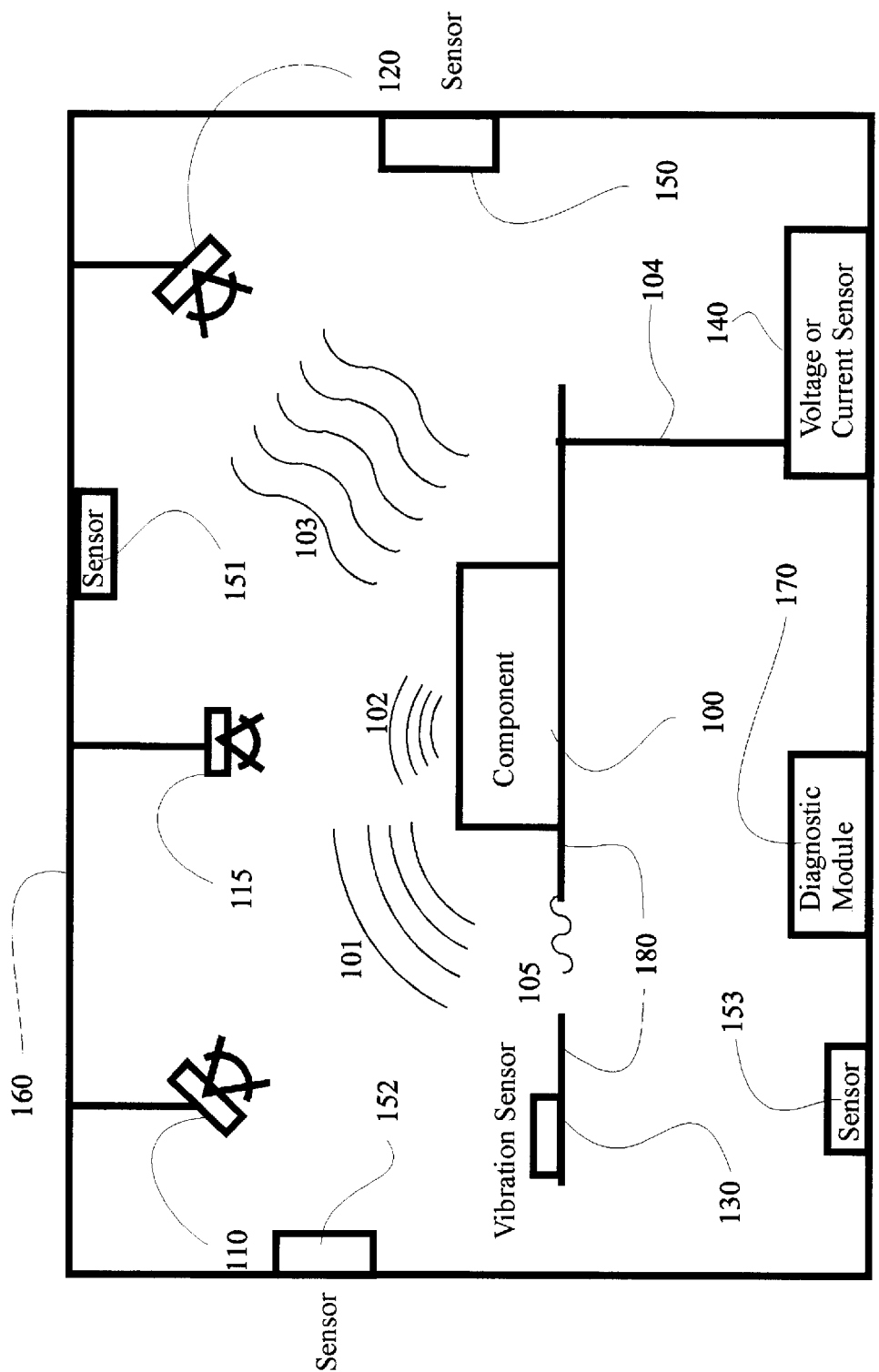
FIG. 5 is a schematic illustration of a generalized component with several signals being emitted and transmitted along a variety of paths, sensed by a variety of sensors and analyzed by the diagnostic module in accordance with the invention and for use in a method in accordance with the invention.

In FIG. 5, a generalized component 100 emitting several signals which are transmitted along a variety of paths, sensed by a variety of sensors and analyzed by the diagnostic device in accordance with the invention is illustrated schematically. Component 100 is mounted to a vehicle 180 and during operation it emits a variety of signals such as acoustic 101, electromagnetic radiation 102, thermal radiation 103, current and voltage fluctuations in conductor 104 and mechanical vibrations 105. Various sensors are mounted in the vehicle to detect the signals emitted by the component 100. These include one or more vibration sensors (accelerometers) 130, 150 and/or gyroscopes also mounted to the vehicle, one or more acoustic sensors 110, 151, electromagnetic radiation sensor 115, heat radiation sensor 120, and voltage or current sensor 140.

In addition, various other sensors 152, 153 measure other parameters of other components that in some manner provide information directly or indirectly on the operation of component 100. All of the sensors illustrated on FIG. 5 can be connected to a data bus 160. A diagnostic module 170, in accordance with the invention, can also be attached to the vehicle data bus 160 and receives the signals generated by the various sensors. The sensors may however be wirelessly connected to the diagnostic module 170 and be integrated into a wireless power and communications system or a combination of wired and wireless connections.

As shown in FIG. 5, the diagnostic module 170 has access to the output data of each of the sensors that have information relative to the component 100. This data appears as a series of numerical values each corresponding to a measured value at a specific point in time. The cumulative data from a particular sensor is called a time series of individual data points. The diagnostic module 170 compares the patterns of data received from each sensor individually, or in combination with data from other sensors, with patterns for which the diagnostic module has been trained to determine whether the component is functioning normally or abnormally.

Important to this invention is the manner in which the diagnostic module 170 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject including: (1) *Techniques And Application Of Neural Networks*, edited by Taylor, M. and Lisboa, P., Ellis Horwood, West Sussex, England, 1993; (2) *Naturally Intelligent Systems*, by Caudill, M. and Butler, C., MIT Press, Cambridge Mass. 1990; (3) J. M. Zaruda, *Introduction to Artificial Neural Systems*, West publishing Co., N.Y., 1992, (4) *Digital Neural Networks*, by Kung, S. Y., PTR Prentice Hall, Englewood Cliffs, N.J., 1993, Eberhart, R., Simpson, P., (5) Dobbins, R., *Computational Intelligence PC Tools*, Academic Press, Inc., 1996, Orlando, Fla., (6) Cristianini, N. and Shawe-Taylor, J *An Introduction to Support Vector Machines and other kernal-based learning methods*, Cambridge University Press, Cambridge England, 2000; (7) *Proceedings of the 2000 6$^{th}$ IEEE International Workshop on Cellular Neural Networks and their Applications* (CNNA 2000), IEEE, Piscataway N.J.; and (8) Sinha, N. K. and Gupta, M. M. *Soft Computing & Intelligent Systems, Academic Press* 2000 San Diego, Calif., all of which are incorporated herein by reference. The neural network pattern recognition technology is one of the most developed of pattern recognition technologies. The invention described herein frequently uses combinations of neural networks to improve the pattern recognition process.

The neural network pattern recognition technology is one of the most developed of pattern recognition technologies The neural network will be used here to illustrate one example of a pattern recognition technology but it is emphasized that this invention is not limited to neural networks. Rather, the invention may apply any known pattern recognition technology including sensor fusion and various correlation technologies. A brief description of a particular example of a neural network pattern recognition technology is set forth below.

Neural networks are constructed of processing elements known as neurons that are interconnected using information channels call interconnects. Each neuron can have multiple inputs but only one output. Each output however is usually connected to all other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out of balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to tire unbalance are also included such as, for example, the vehicle speed or wheel speed that can be determined from the ABS system. Data is taken from a variety of vehicles where the tires were accurately balanced under a variety of operating conditions also for cases where varying amounts of unbalance was intentionally introduced. Once the data had been collected, some degree of preprocessing or feature extraction is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network-generating program, for example, if a neural network pattern recognition system is to be used. Such programs are available commercially, e.g., from NeuralWare of Pittsburgh, Pa. or from International Scientific Research, Inc., of Romeo Mich. for modular neural networks. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, FPGA, or DSP (herein collectively referred to as a microprocessor or processor). Such a microprocessor appears inside the diagnostic module 170 in FIG. 5. Once trained, the neural network, as represented by the algorithm, will now recognize an unbalanced tire on a vehicle when this event occurs. At that time, when the tire is unbalanced, the diagnostic module 170 will output a message to the driver indicating that the tire should be now be balanced as described in more detail below. The message to the driver is provided by output means coupled to or incorporated within the module 170 and may be, e.g., a light on the dashboard, a vocal tone or any other recognizable indication apparatus. A similar message may also be sent to the dealer or other repair facility or remote facility.

It is important to note that there may be many neural networks involved in a total vehicle diagnostic system. These can be organized either in parallel, series, as an ensemble, cellular neural network or as a modular neural network system. In one implementation of a modular neural network, a primary neural network identifies that there is an abnormality and tries to identify the likely source. Once a choice has been made as to the likely source of the abnormality, another of a group of neural networks is called upon to determine the exact cause of the abnormality. In this manner, the neural networks are arranged in a tree pattern with each neural network trained to perform a particular pattern recognition task.

Discussions on the operation of a neural network can be found in the above references on the subject and are well understood by those skilled in the art. Neural networks are the most well known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, render these systems impractical for general vehicle diagnostic problems such as described herein. Therefore, preferably the pattern recognition systems that learn by training are used herein.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

Figure 6:
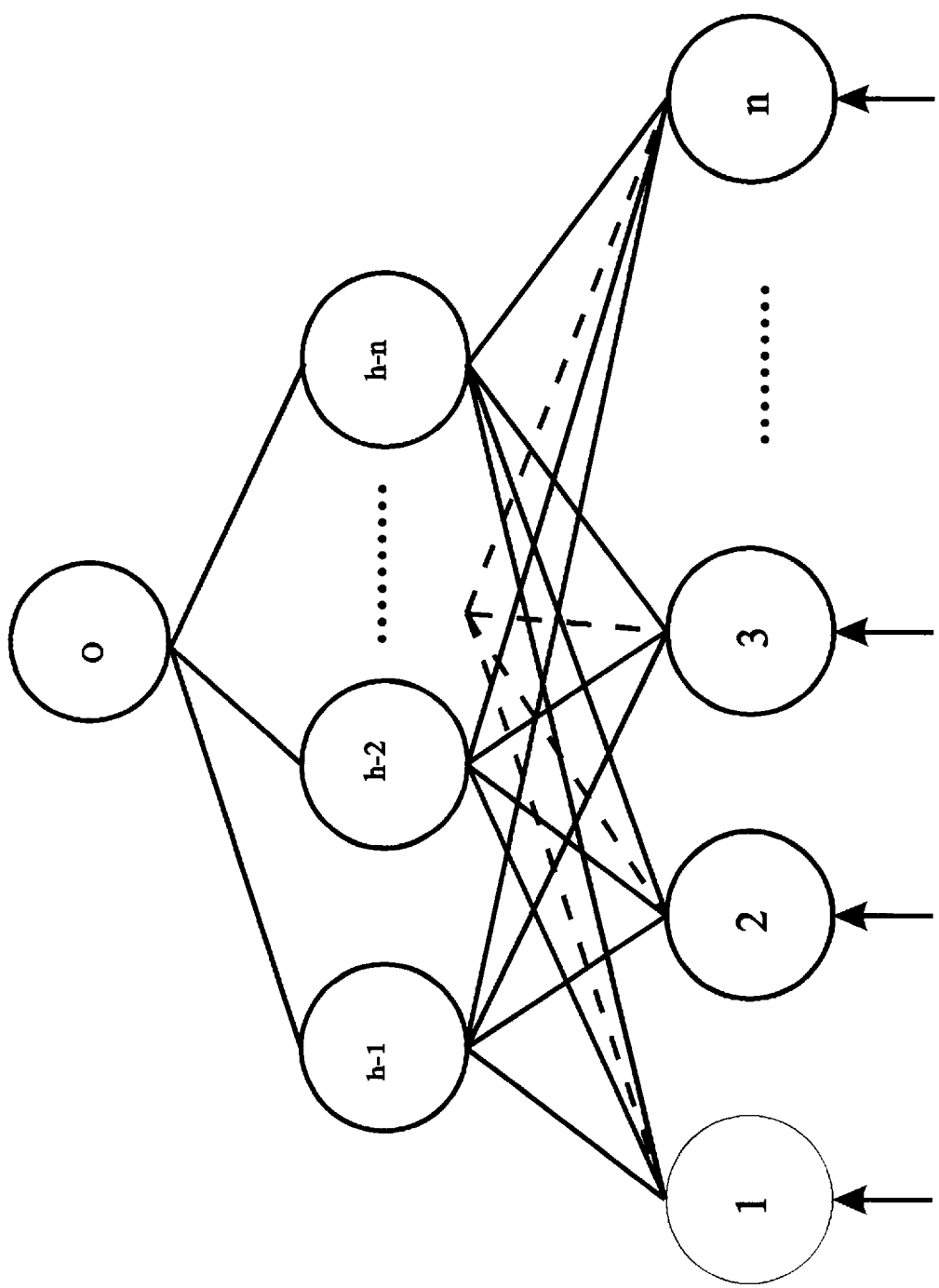
FIG. 6 is a schematic of one pattern recognition methodology known as a neural network which may be used in a method in accordance with the invention.

A diagram of one example of a neural network used for diagnosing an unbalanced tire, for example, based on the teachings of this invention is shown in FIG. 6. The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer for example, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-1, h-2, . . . , h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node 0 representing the decision to notify the driver, and/or a remote facility, of the unbalanced tire. During the training phase, an output node value of 1, for example, is assigned to indicate that the driver should be notified and a value of 0 is assigned to not doing so. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver, and/or a remote facility, and comprises the steps of (a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) notifying a driver if the value on one output series node is within a chosen range signifying that a tire requires balancing.

This method can be generalized to a method of predicting that a component of a vehicle will fail comprising the steps of (a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver and/or a remote facility if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor, FPGA, DSP or in a neural computer (including a cellular neural network or support vector machine). In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 170 contains preprocessing and neural network algorithms for a number of component failures. The neural network algorithms are generally relatively simple, requiring only a relatively small number of lines of computer code. A single general neural network program can be used for multiple pattern recognition cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus or from other sources, those patterns that predict failure of a particular component.

Figure 7:
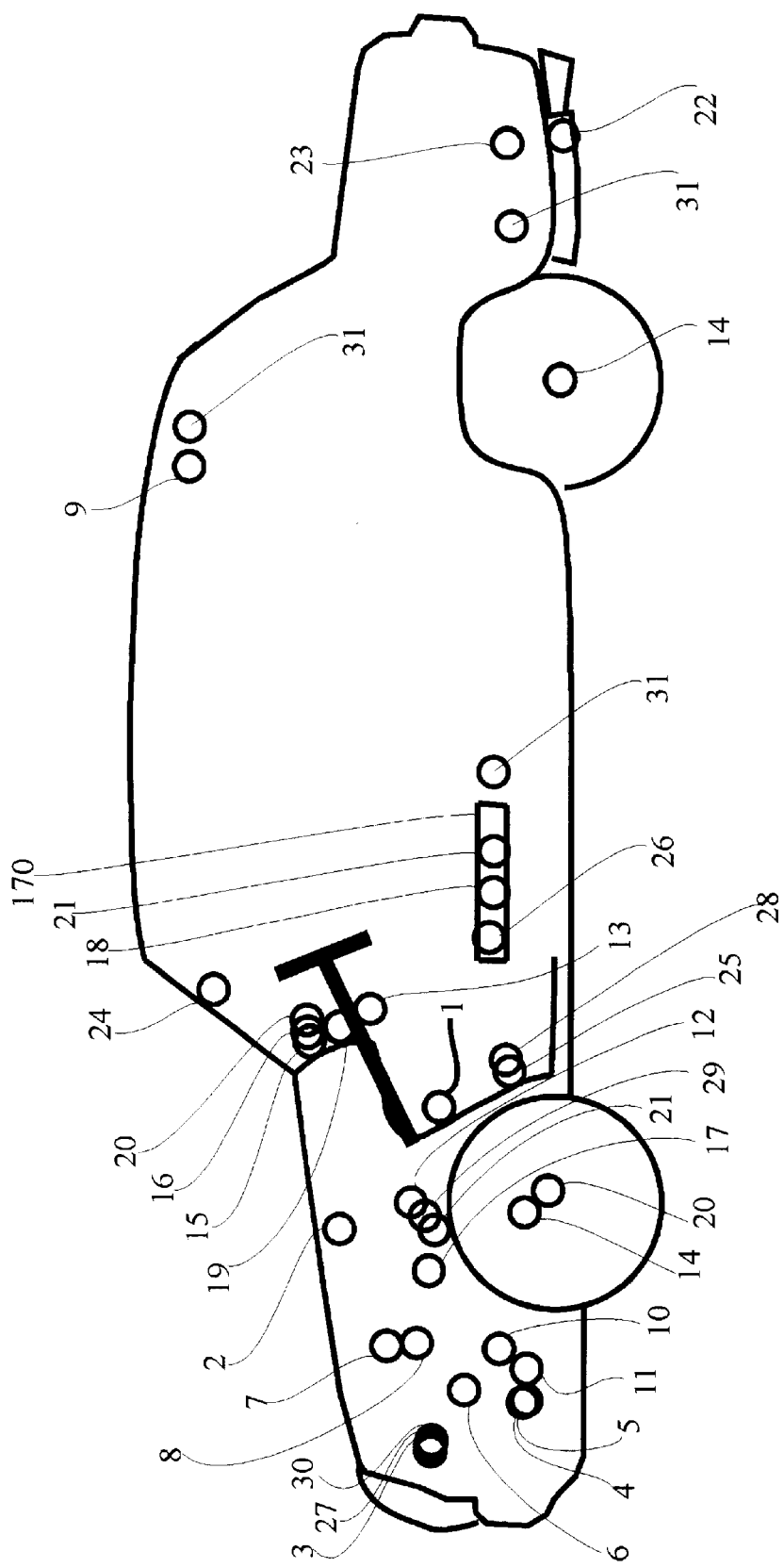
FIG. 7 is a schematic of a vehicle with several components and several sensors and a total vehicle diagnostic system in accordance with the invention utilizing a diagnostic module in accordance with the invention and which may be used in a method in accordance with the invention.
Figure 8:
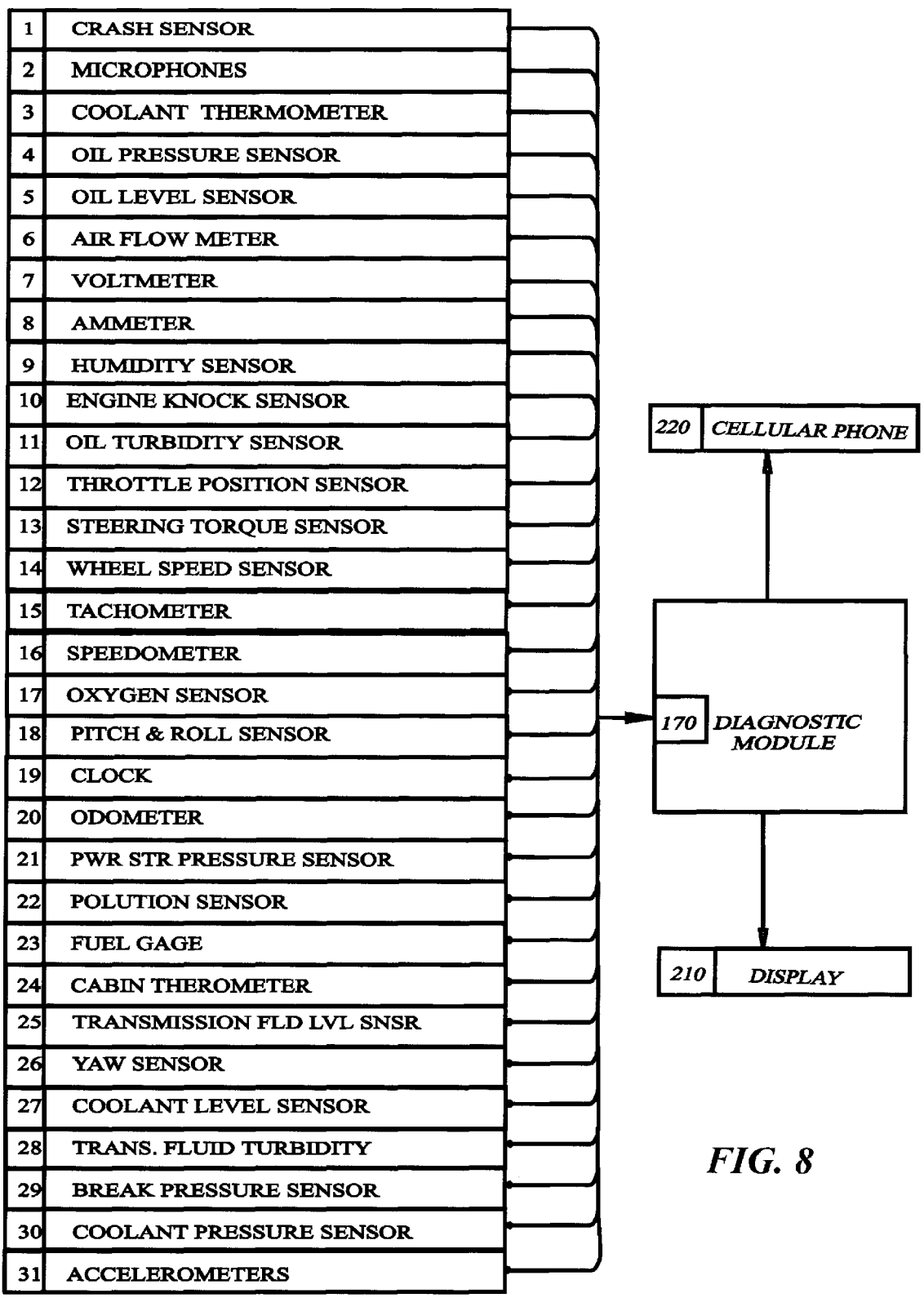
FIG. 8 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

In FIG. 7, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown in FIG. 7 onto the vehicle data bus and thereby into the diagnostic device in accordance with the invention is shown in FIG. 8 along with outputs to a display for notifying the driver and to the vehicle cellular phone, or other communication device, for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 8 also contains the names of the sensors shown numbered on FIG. 7.

Sensor 1 is a crash sensor having an accelerometer (alternately one or more dedicated accelerometers can be used), sensor 2 is represents one or more microphones, sensor 3 is a coolant thermometer, sensor 4 is an oil pressure sensor, sensor 5 is an oil level sensor, sensor 6 is an air flow meter, sensor 7 is a voltmeter, sensor 8 is an ammeter, sensor 9 is a humidity sensor, sensor 10 is an engine knock sensor, sensor 11 is an oil turbidity sensor, sensor 12 is a throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor, sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor 26 is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

If a distributed group of acceleration sensors or accelerometers are used to permit a determination of the location of a vibration source, the same group can, in some cases, also be used to measure the pitch, yaw and/or roll of the vehicle eliminating the need for dedicated angular rate sensors. In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, roll over sensing etc.

Consider now some examples. The following is a partial list of potential component failures and the sensors from the list on FIG. 8 that might provide information to predict the failure of the component:

| | |
|---|---|
| Out of balance tires | 1, 13, 14, 15, 20, 21 |
| Front end out of alignment | 1, 13, 21, 26 |
| Tune up required | 1, 3, 10, 12, 15, 17, 20, 22 |
| Oil change needed | 3, 4, 5, 11 |
| Motor failure | 1, 2, 3, 4, 5, 6, 10, 12, 15, 17, 22 |
| Low tire pressure | 1, 13, 14, 15, 20, 21 |
| Front end looseness | 1, 13, 16, 21, 26 |
| Cooling system failure | 3, 15, 24, 27, 30 |
| Alternator problems | 1, 2, 7, 8, 15, 19, 20 |
| Transmission problems | 1, 3, 12, 15, 16, 20, 25, 28 |
| Differential problems | 1, 12, 14 |
| Brakes | 1, 2, 14, 18, 20, 26, 29 |
| Catalytic converter and muffler | 1, 2, 12, 15, 22 |
| Ignition | 1, 2, 7, 8, 9, 10, 12, 17, 23 |
| Tire wear | 1, 13, 14, 15, 18, 20, 21, 26 |
| Fuel leakage | 20, 23 |
| Fan belt slippage | 1, 2, 3, 7, 8, 12, 15, 19, 20 |
| Alternator deterioration | 1, 2, 7, 8, 15, 19 |
| Coolant pump failure | 1, 2, 3, 24, 27, 30 |
| Coolant hose failure | 1, 2, 3, 27, 30 |
| Starter failure | 1, 2, 7, 8, 9, 12, 15 |
| Dirty air filter | 2, 3, 6, 11, 12, 17, 22 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed cannot be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to this invention as in the combination of several such temporal patterns. Fourth, the vibration measuring capability of the airbag crash sensor, or other accelerometer, is useful for most of the cases discussed above yet there is no such current use of accelerometers. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that this and other chemical sensors will be used more in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state. Note that neural networks can simultaneously analyze data from multiple sensors of the same type or different types.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail. As envisioned, on some automobiles, when the diagnostic module 170 detects a potential failure it not only notifies the driver through a display 210, but also automatically notifies the dealer through a vehicle cellular phone 220 or other telematics communication link. The dealer can thus contact the vehicle owner and schedule an appointment to undertake the necessary repair at each party's mutual convenience. Contact by the dealer to the vehicle owner can occur as the owner is driving the vehicle, using a communications device. Thus, the dealer can contact the driver and informed him of their mutual knowledge of the problem and discuss scheduling maintenance to attend to the problem. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery. Additionally, this system can be coupled to a system such as OnStar or a vehicle route guidance system, and the driver can be guided to the nearest open repair facility or a facility of his or her choice.

In the discussion above, the diagnostic module of this invention assumes that a vehicle data bus exists which is used by all of the relevant sensors on the vehicle. Most vehicles today do not have a data bus although it is widely believed that most vehicles will have one in the near future. Naturally, the relevant signals can be transmitted to the diagnostic module through a variety of coupling means other than through a data bus and this invention is not limited to vehicles having a data bus. For example, the data can be sent wirelessly to the diagnostic module using the Bluetooth specification. In some cases, even the sensors do not have to be wired and can obtain their power via RF from the interrogator as is well known in the RFID-radio frequency identification (either silicon or surface acoustic wave (SAW) based)) field. Alternately an inductive or capacitive power transfer system can be used.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. Note that in some cases, simulations can be used to analytically generate the relevant data.

Figure 9:
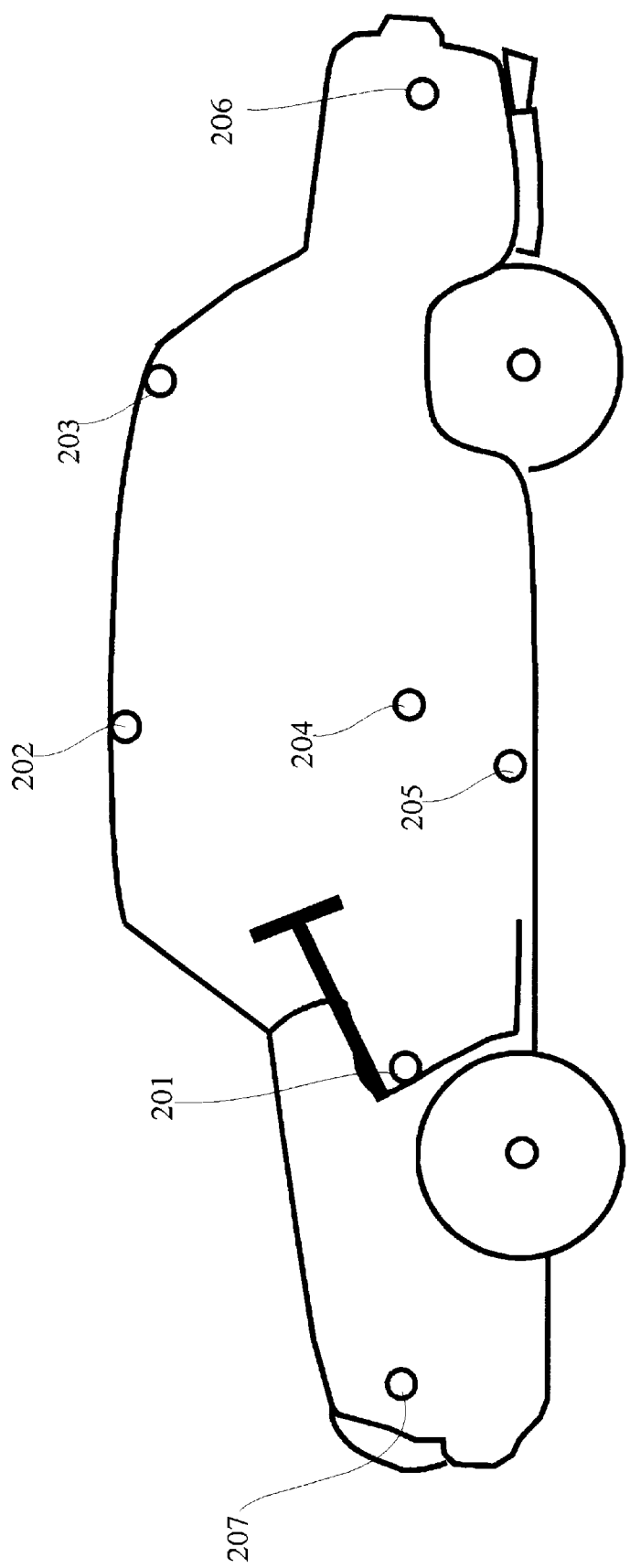
FIG. 9 is a schematic of a vehicle with several accelerometers and/or gyroscopes at preferred locations in the vehicle.

FIG. 9 illustrates the placement of a variety of sensors, primarily accelerometers and/or gyroscopes, which can be used to diagnose the state of the vehicle itself. Sensor 201 can measure the acceleration of the firewall or instrument panel and is located thereon generally midway between the two sides of the vehicle. Sensor 202 can be located in the headliner or attached to the vehicle roof above the side door. Typically, there can be two such sensors one on either side of the vehicle. Sensor 203 is shown in a typical mounting location midway between the sides of the vehicle attached to or near the vehicle roof above the rear window. Sensor 206 is shown in a typical mounting location in the vehicle trunk adjacent the rear of the vehicle. Either one, two or three such sensors can be used depending on the application. If three such sensors are use one would be adjacent each side of vehicle and one in the center. Sensor 204 is shown in a typical mounting location in the vehicle door and sensor 205 is shown in a typical mounting location on the sill or floor below the door. Finally, sensor 207, which can be also multiple sensors, is shown in a typical mounting location forward in the crush zone of the vehicle. If three such sensors are used, one would be adjacent each vehicle side and one in the center.

In general, sensors 201–207 provide a measurement of the state of the vehicle, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 201–207 above is merely exemplary and is not intended to limit the form of the sensor or its function.

Each of the sensors 201–207 may be single axis, double axis or triaxial accelerometers and/or gyroscopes typically of the MEMS type. These sensors 201–207 can either be wired to the central control module or processor directly wherein they would receive power and transmit information, or they could be connected onto the vehicle bus or, in some cases, using RFID, SAW or similar technology, the sensors can be wireless and would receive their power through RF from one or more interrogators located in the vehicle. In this case, the interrogators can be connected either to the vehicle bus or directly to control module. Alternately, an inductive or capacitive power and information transfer system can be used.

One particular implementation will now be described. In this case, each of the sensors 201–207 is a single or dual axis accelerometer. They are made using silicon micromachined technology such as disclosed in U.S. Pat. Nos. 5,121,180 and 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

The angular rate function can be obtained through placing accelerometers at two separated, non-co-located points in a vehicle and using the differential acceleration to obtain an indication of angular motion and angular acceleration. From the variety of accelerometers shown on FIG. 9, it can be appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes. Alternately, it has been found that from a single package containing up to three low cost MEMS gyroscopes and three low cost MEMS accelerometers, when carefully calibrated, an accurate inertial measurement unit (IMU) can be constructed that performs as well as units costing a great deal more. Such a package is sold by Crossbow Technology, Inc. 41 Daggett Dr., San Jose, Calif. 95134. If this IMU is combined with a GPS system and sometimes other vehicle sensor inputs using a Kalman filter, accuracy approaching that of expensive military units can be achieved.

Instead of using two accelerometers at separate locations on the vehicle, a single conformal MEMS-IDT gyroscope may be used. Such a conformal MEMS-IDT gyroscope is described in a paper by V. K. Karadan, Conformal MEMS-IDT Gyroscopes and Their Comparison With Fiber Optic Gyro, incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures. Other SAW-based gyroscopes are also now under development.

The system of FIG. 9 using dual axis accelerometers, or the IMU Kalman filter system, therefore provides a complete diagnostic system of the vehicle itself and its dynamic motion. Such a system is far more accurate than any system currently available in the automotive market. This system provides very accurate crash discrimination since the exact location of the crash can be determined and, coupled with a knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers at a variety of locations in the vehicle, or the IMU Kalman filter system significant improvements are made in the vehicle stability control, crash sensing, rollover sensing, and resulting occupant protection technologies.

Finally, as mentioned above, the combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 9 and simultaneously the dynamic strain gage measurements from seat mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, sensor 208 represents one or more strain gage weight sensors mounted on the seat or in connection with the seat or its support structure. Suitable mounting locations and forms of weight sensors are discussed in the current assignee's U.S. patent application Ser. No. 09/193,209 and contemplated for use in this invention as well. The mass or weight of the occupying item of the seat can thus be measured based on the dynamic measurement of the strain gages with optional consideration of the measurements of accelerometers on the vehicle, which are represented by any of sensors 201–207.

Figure 10:
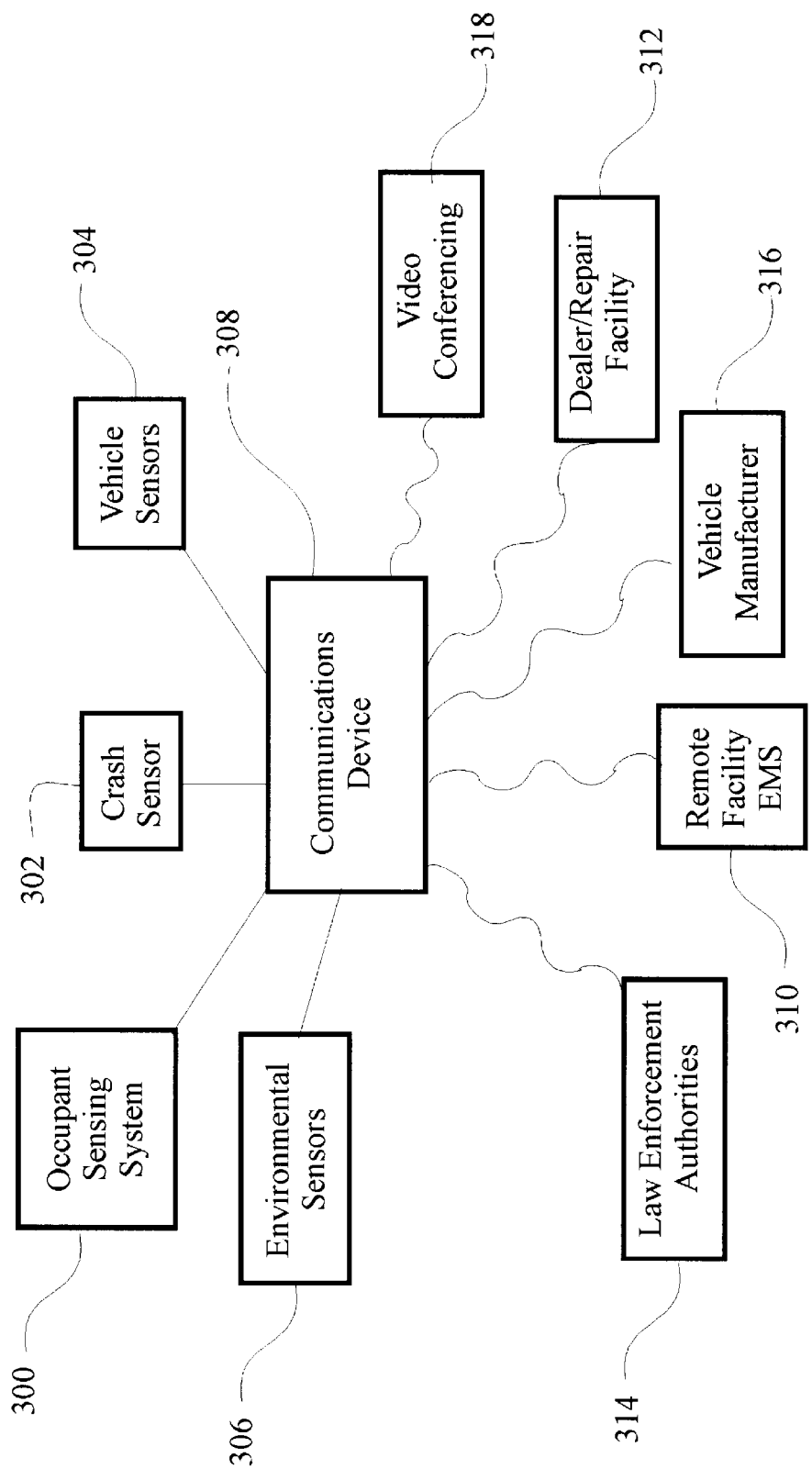
FIG. 10 is a schematic view of overall telematics system in accordance with the invention.

FIG. 10 shows a schematic of the integration of the occupant sensing with a telematics link and the vehicle diagnosis with a telematics link. As envisioned, the occupant sensing system 300 includes those components which determine the presence, position, health state, and other information relating to the occupants, for example the transducers discussed above with reference to FIGS. 1–3 and the SAW device discussed above with reference to FIG. 4. Information relating to the occupants includes information as to what the driver is doing, talking on the phone, communicating with OnStar or other route guidance, listening to the radio, sleeping, drunk, drugged, having a heart attack The occupant sensing system may also be any of those systems and apparatus described in any of the current assignee's above-referenced patents and patent applications incorporated by reference herein, or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor 302 is provided and determines when the vehicle experiences a crash. Crash sensor 302 may be any type of crash sensor.

Vehicle sensors 304 include sensors which detect the operating conditions of the vehicle such as those sensors discussed with reference to FIGS. 3–31 above. Also included are tire sensors such as disclosed in U.S. patent application Ser. No. 10/079,065. Other examples include velocity and acceleration sensors, and angular and angular rate pitch, roll and yaw sensors. Of particular importance are sensors that tell what the car is doing: speed, skidding, sliding, location, communicating with other cars or the infrastructure, etc.

Environment sensors 306 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 300, crash sensors 302, vehicle sensors 304, environment sensors 306 all are coupled to a communications device 308 which may contain a memory unit and appropriate electrical hardware to communicate with all of the sensors, process data from the sensors, and transmit data from the sensors. The memory unit would be useful to store data from the sensors, updated periodically, so that such information could be transmitted at set time intervals.

The communications device 308 can be designed to transmit information to any number of different types of facilities. For example, the communications device 308 would be designed to transmit information to an emergency response facility 310 in the event of an accident involving the vehicle. The transmission of the information would be triggered by a signal from the crash sensor 302 that the vehicle was experiencing a crash or experienced a crash. The information transmitted would come from the occupant sensing system 300 so that the emergency response could be tailored to the status of the occupants. For example, if the vehicle was determined to have ten occupants, multiple ambulances might be sent than if the vehicle contained only a single occupant. Also, if the occupants are determined not be breathing, then a higher priority call with living survivors might receive assistance first. As such, the information from the occupant sensing system 300 would be used to prioritize the duties of the emergency response personnel.

Information from the vehicle sensors 304 and environment sensors 306 could also be transmitted to law enforcement authorities 314 in the event of an accident so that the cause(s) of the accident could be determined. Such information can also include information from the occupant sensing system 300, which might reveal that the driver was talking on the phone, putting on make-up, or another distracting activity, information from the vehicle sensors 304 which might reveal a problem with the vehicle, and information from the environment sensors 306 which might reveal the existence of slippery roads, dense fog and the like.

Information from the occupant sensing system 300, vehicle sensors 304 and environment sensors 306 could also be transmitted to the vehicle manufacturer 316 in the event of an accident so that a determination can be made as to whether failure of a component of the vehicle causes or contributed to the cause of the accident. For example, the vehicle sensors might determine that the tire pressure was too low so that advice can be disseminated to avoid maintaining the tire pressure too low in order to avoid an accident. Information from the vehicle sensors 304 relating to component failure could be transmitted to a dealer/repair facility 312 which could schedule maintenance to correct the problem.

The communications device 308 could be designed to transmit particular information to each site, i.e., only information important to be considered by the personnel at that site. For example, the emergency response personnel have no need for the fact that the tire pressure was too low but such information is important to the law enforcement authorities 314 (for the possible purpose of issuing a recall of the tire and/or vehicle) and the vehicle manufacturer 316.

The communication device can be a cellular phone, OnStar or other subscriber based telematics system, a peer-to-peer vehicle communication system that eventually communicates to the infrastructure and then, perhaps, to the Internet with email to the dealer, manufacturer, vehicle owner, law enforcement authorities or others. It can also be a vehicle to LEO or Geostationary satellite system such as SkyBytes which can then forward the information to the appropriate facility either directly or through the Internet.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar, a cellular phone system, a communication via GEO, geocentric or other satellite system and any communication that communicates the results of a pattern recognition system analysis. Also any communication from a vehicle that combines sensor information with location information.

When optical sensors are provided as part of the occupant sensing system 300, video conferencing becomes a possibility, whether or not the vehicle experiences a crash. That is, the occupants of the vehicle can engage in a video conference with people at another location 318 via establishment of a communications channel by the communications device 308.

Among the inventions disclosed above is an arrangement for obtaining and conveying information about occupancy of a passenger compartment of a vehicle comprises at least one wave-receiving sensor for receiving waves from the passenger compartment, generating means coupled to the wave-receiving sensor(s) for generating information about the occupancy of the passenger compartment based on the waves received by the wave-receiving sensor(s) and communications means coupled to the generating means for transmitting the information about the occupancy of the passenger compartment. As such, response personnel can receive the information about the occupancy of the passenger compartment and respond appropriately, if necessary. There may be several wave-receiving sensors and they may be, e.g., ultrasonic wave-receiving sensors, electromagnetic wave-receiving sensors, capacitance or electric field sensors, or combinations thereof The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. One or more memory units may be coupled to the generating means for storing the information about the occupancy of the passenger compartment and to the communications means. The communications means then can interrogate the memory unit(s) upon a crash of the vehicle to thereby obtain the information about the occupancy of the passenger compartment. In one particularly useful embodiment, means for determining the health state of at least one occupant are provided, e.g., a heartbeat sensor, a motion sensor such as a micropower impulse radar sensor for detecting motion of the at least one occupant and motion sensor for determining whether the occupant(s) is/are breathing, and coupled to the communications means. The communications means can interrogate the health state determining means upon a crash of the vehicle to thereby obtain and transmit the health state of the occupant(s). The health state determining means can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant(s), or an analysis of waves from the space occupied by the occupant(s). Each wave-receiving sensor generates a signal representative of the waves received thereby and the generating means may comprise a processor for receiving and analyzing the signal from the wave-receiving sensor in order to generate the information about the occupancy of the passenger compartment. The processor can comprise pattern recognition means for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating means is an indication of whether the occupant is breathing. Also, the wave-receiving sensor may generate a signal representative of the waves received thereby and the generating means receive this signal over time and determine whether any occupants in the passenger compartment are moving. As such, the information about the occupancy of the passenger compartment generated by the generating means includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

All of the above-described methods and apparatus may be used in conjunction with one another and in combination with the methods and apparatus for optimizing the driving conditions for the occupants of the vehicle described herein.

Also described above is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, processor means coupled to the sensors for receiving and processing the electrical signals and for determining if the component is operating abnormally based on the electrical signals, and output means coupled to the processor means for affecting another system within the vehicle if the component is operating abnormally. The processor means preferably comprise pattern recognition means such as a trained pattern recognition algorithm, a neural network, modular neural networks, an ensemble of neural networks, a cellular neural network, or a support vector machine. In some cases, fuzzy logic will be used which can be combined with a neural network to form a neural fuzzy algorithm. The another system may be a display for indicating the abnormal state of operation of the component arranged in a position in the vehicle to enable a driver of the vehicle to view the display and thus the indicated abnormal operation of the component. At least one source of additional information, e.g., the time and date, may be provided and input means coupled to the vehicle for inputting the additional information into the processor means. The another system may also be a warning device including transmission means for transmitting information related to the component abnormal operating state to a site remote from the vehicle, e.g., a vehicle repair facility.

Although several preferred embodiments are illustrated and described above, there are possible combinations using other geometries, sensors, materials and different dimensions for the components that perform the same functions. This invention is not limited to the above embodiments and should be determined by the following claims.

We claim:

1. A vehicle, comprising:

an occupant sensing system arranged to determine at least one property or characteristic of occupancy of the vehicle constituting information about the occupancy of the vehicle; and a communications device coupled to said occupant sensing system and arranged to automatically establish a communications channel between the vehicle and a remote facility without manual intervention to thereby enable the information about the occupancy of the vehicle determined by said occupant sensing system to be transmitted to the remote facility, said occupant sensing system including an image-obtaining sensor arranged to obtain images of the passenger compartment of the vehicle, said communications device being arranged to transmit the images obtained by said image-obtaining sensor.

2. The vehicle of claim 1, wherein said communications device comprises a cellular telephone system including an antenna.

3. The vehicle of claim 1, further comprising a crash sensor for determining when the vehicle experiences a crash, said image-obtaining sensor being arranged to obtain images including the driver of the vehicle, said communications device being coupled to said crash sensor and arranged to transmit images of the passenger compartment just prior to the crash once said crash sensor has determined that the vehicle has experienced a crash.

4. The vehicle of claim 1, further comprising a crash sensor for determining when the vehicle experiences a crash, said image-obtaining sensor being arranged to obtain images including the driver of the vehicle, said communications device being coupled to said crash sensor and arranged to transmit images of the passenger compartment during die crash once said crash sensor predetermined that the vehicle has experienced a crash.

5. The vehicle of claim 1, further comprising a crash sensor for determining when the vehicle experiences a crash, said image-obtaining sensor being arranged to obtain images including the driver of the vehicle, said communications device being coupled to said crash sensor and arranged to transmit images of the passenger compartment after the crash once said crash sensor has determined that the vehicle has experienced a crash.

6. A vehicle, comprising:
   an occupant sensing system arranged to determine at least one property or characteristic of occupancy of the vehicle constituting information about the occupancy of the vehicle; and
   a communications device coupled to said occupant sensing system and arranged to automatically establish a communications channel between the vehicle with a remote facility without manual intervention to thereby enable the information about the occupancy of the vehicle determined by said occupant sensing system to be transmitted to the remote facility,
   said occupant sensing system including at least one motion sensor for obtaining information about motion of occupants in the passenger compartment, said communications device being arranged to transmit information about any motion of occupants in the passenger compartment obtained by said at least one motion sensor as part of the information about the occupancy of the vehicle.

7. The vehicle of claim 1, wherein said occupant sensing system comprises determining means for determining the number of occupants in the vehicle, said communications device being arranged to transmit the number of occupants in the passenger compartment as part of the information about the occupancy of the vehicle.

8. A vehicle, comprising:
   an occupant sensing system arranged to determine at least one property or characteristic of occupancy of the vehicle constituting information about the occupancy of the vehicle; and
   a communications device coupled to said occupant sensing system and arranged to automatically establish a communications channel between the vehicle and a remote facility without manual intervention to thereby enable the information about the occupancy of the vehicle determined by said occupant sensing system to be transmitted to the remote facility,
   said occupant sensing system comprising determining means for determining the number of occupants in the vehicle, said communications device being arranged to transmit the number of occupants in the passenger compartment as part of the information about the occupancy of the vehicle,
   said determining means comprising receivers arranged to receive waves, energy or radiation from all of the seating locations in the passenger compartment and a processor arranged to determine the number of occupants in the passenger compartment from the received waves, energy or radiation.

9. The vehicle of claim 7, wherein said determining means comprise sensors selected from a group consisting of heartbeat sensors, weight sensors associated with seats in the vehicle and chemical sensors.

10. A vehicle, comprising:
    an occupant sensing system arranged to determine at least one property or characteristic of occupancy of the vehicle constituting information about the occupancy of the vehicle; and
    a communications device coupled to said occupant sensing system and arranged to automatically establish a communications channel between the vehicle and a remote facility without manual intervention to thereby enable the information about the occupancy of the vehicle determined by said occupant sensing system to be transmitted to the remote facility,
    said occupant sensing system comprising determining means for determining the number of occupants in the vehicle, said communications device being arranged to transmit the number of occupants in the passenger compartment as part of the information about the occupancy of the vehicle,
    said processor being arranged to determine the condition of any occupants in the vehicle.

11. The vehicle of claim 10, wherein said occupant sensing system comprises receivers arranged to receive waves, energy or radiation from the passenger compartment, said processor being arranged to determine the condition of any occupants in the vehicle based on the received waves, energy or radiation, said communications device being arranged to transmit the condition of the occupants as part of the information about the occupancy of the vehicle.

12. The vehicle of claim 1, further comprising at least one vehicle sensor each sensing a state of the vehicle or a state of a component of the vehicle, said communications device being coupled to said at least one vehicle sensor and being arranged to transmit the state of the vehicle or the state of the component of the vehicle.

13. The vehicle of claim 1, further comprising at least one environment sensor each arranged to sense a state of the environment around and exterior of the vehicle, said communications device being coupled to said at least one environment sensor and being arranged to transmit information about the environment of the vehicle as sensed by said at least one environment sensor.

14. The vehicle of claim 13, wherein said at least one environment sensor includes an optical sensor for obtaining images of the environment around the vehicle.

15. The vehicle of claim 13, wherein said at least one environment sensor includes at least one of a road condition sensor arranged to sense the condition of a road on which the vehicle is travelling, an ambient temperature sensor arranged to sensor the temperature of the atmosphere surrounding the vehicle, an internal temperature sensor arranged to sense the temperature in the passenger compartment of the vehicle, a clock, and a location sensor arranged to sense the location of objects around the vehicle, sensors which sense the presence of rain, snow, sleet and fog, the presence and location of potholes, ice and snow cover, the presence and status of the road and traffic, sensors which obtain images of the environment surrounding the vehicle, blind spot detectors which provides data on the blind spot of the driver, automatic cruise control sensors that can provide images of vehicles in front of the vehicle and radar devices which provide the position of other vehicles and objects relative to the vehicle.

16. The vehicle of claim 1, further comprising a crash sensor for determining when the vehicle experiences a crash, said communications device being coupled to said crash sensor and arranged to transmit information about the occupancy of the vehicle upon said crash sensor determining that the vehicle has experienced a crash.

17. The vehicle of claim 1, further comprising a memory unit coupled to said occupant sensing system and said communications device, said memory unit being arranged to receive the information about the occupancy of the vehicle from said occupant sensing system and store the information about the occupancy of the vehicle, said communications device being arranged to interrogate said memory unit to obtain the stored information about the occupancy of the vehicle to enable transmission thereof.

18. A method for monitoring and providing assistance to a vehicle, comprising the steps of:
   determining at least one property or characteristic of occupancy of the vehicle constituting information about the occupancy of the vehicle;
   automatically establishing a communications channel between the vehicle and a remote facility without manual intervention to thereby enable the information about the occupancy of the vehicle to be transmitted to the remote facility;
   at the remote facility, considering the information about the occupancy of the vehicle received from the vehicle and directing assistance to the vehicle based on the transmitted information;
   obtaining images of the passenger compartment of the vehicle; and
   transmitting the images of the passenger compartment after the crash.

19. The method of claim 18, further comprising the steps of:
   determining when the vehicle experiences a crash, the step of obtaining images of the passenger compartment comprising the step of obtaining images including the driver of the vehicle; and
   transmitting the images of the passenger compartment just prior to the crash once it has determined that the vehicle has experienced a crash.

20. A method for monitoring and providing assistance to a vehicle, comprising the steps of:
   determining at least one property or characteristic of occupancy of the vehicle constituting information about the occupancy of the vehicle;
   automatically establishing a communications channel between the vehicle and a remote facility without manual intervention to thereby enable the information about the occupancy of the vehicle to be transmitted to the remote facility;
   at the remote facility, considering the information about the occupancy of the vehicle received from the vehicle and directing assistance to the vehicle based on the transmitted information;
   the step of determining at least one property or characteristic of occupancy of the vehicle comprising the step of determining any motion in the passenger compartment of the vehicle, whereby information about any motion of occupants in the passenger compartment is transmitted as part of the information about the occupancy of the vehicle.

21. The method of claim 18, wherein the step of determining at least one property or characteristic of occupancy of the vehicle comprises the step of determining the number of occupants in the passenger compartment, the number of occupants in the passenger compartment being transmitted as part of the information about the occupancy of the vehicle.

22. A method for monitoring and providing assistance to a vehicle, comprising the steps of:
   determining at least one property of characteristic of occupancy of the vehicle constituting information about the occupancy of the vehicle;
   automatically establishing a communications channel between the vehicle and a remote facility without manual intervention to thereby enable the information about the occupancy of the vehicle to be transmitted to the remote facility;
   at the remote facility, considering the information about the occupancy of the vehicle received from the vehicle and directing assistance to the vehicle based on the transmitted information;
   the step of determining at least one property or characteristic of occupancy of the vehicle comprising the step of determining the number of occupants in the passenger compartment, the number of occupants in the passenger compartment being transmitted as part of the information about the occupancy of the vehicle,
   wherein the step of determining the number of occupants in the vehicle comprising the steps of receiving waves, energy or radiation from all of the seating locations in the passenger compartment and determining the number of occupants in the passenger compartment from the received waves, energy or radiation, the number of occupants in the passenger compartment being transmitted as part of the information about the occupancy of the vehicle.

23. The method of claim 21, wherein the step of determining the number of occupants in the vehicle comprises the step of arranging at least one heartbeat sensor in the vehicle to detect the presence of heartbeats in the vehicle such that the number of occupants is determinable from the number of detected heartbeats.

24. The method of claim 21, wherein the step of determining the number of occupants in the vehicle comprises the step of arranging at least one weight sensor system in the vehicle to detect at least one of the weight and weight distribution applied to the seats such that the number of occupants is determinable from the at least one of the detected weight and weight distribution.

25. The method of claim 21, wherein the step of determining the number of occupants in the vehicle comprises the step of arranging at least one temperature sensor to measure temperature in the passenger compartment whereby the number of occupants is determinable from the measured temperature in the passenger compartment.

26. The method of claim 21, wherein the step of determining the number of occupants in the vehicle comprises the step of arranging at least one seatbelt buckle switch to provide an indication of the seatbelt being buckled whereby the number of occupants is determinable from the buckled state of the seatbelts.

27. The method of claim 21, wherein the step of determining the number of occupants in the vehicle comprises the step of arranging at least one chemical sensor to provide an indication of the presence of a chemical indicative of the presence of an occupant whereby the number of occupants is determinable from the indication of the presence of the chemical indicative of the presence of an occupant.

28. A method for monitoring and providing assistance to a vehicle, comprising the steps of:

determining at least one property or characteristic of occupancy of the vehicle constituting information about the occupancy of the vehicle;

automatically establishing a communications channel between the vehicle and a remote facility without manual intervention to thereby enable the information about the occupancy of the vehicle to be transmitted to the remote facility;

at the remote facility, considering the information about the occupancy of the vehicle received from the vehicle and directing assistance to the vehicle based on the transmitted information;

the step of determining at least one property of characteristic of occupancy of the vehicle comprising the steps of receiving waves, energy or radiation from at least one of the seating locations in the passenger compartment and determining the condition of any occupants in the vehicle based on the received waves, energy or radiation, the condition of the occupants being transmitted as part of the information about the occupancy of the vehicle.

29. The method of claim 18, wherein the step of determining at least one property or characteristic of occupancy of the vehicles comprises the step of determining the number of human occupants in the passenger compartment.

30. The method of claim 18, further comprising the steps of:

sensing a state of the vehicle or a state of a component of the vehicle; and transmitting the state of the vehicle or the state of the component of the vehicle.

31. The method of claim 18, further comprising the steps of:

sensing a state of the environment around and exterior of the vehicle; and transmitting information about the environment of the vehicle.

32. The method of claim 18, further comprising the step of determining when the vehicle experiences a crash, the step of transmitting information about the occupancy of the vehicle comprising the step of transmitting information when it has been determined that the vehicle has experienced a crash.

33. The method of claim 18, further comprising the steps of:

providing a memory unit in the vehicle to receive the information about the occupancy of the vehicle and store the information about the occupancy of the vehicle; and interrogating the memory unit to obtain the stored information about the occupancy of the vehicle to enable transmission thereof.

34. A method for monitoring and providing assistance to a vehicle, comprising the steps of:

determining at least one property or characteristic of occupancy of the vehicle constituting information about the occupancy of the vehicle;

determining at least one state of the vehicle or of a component of the vehicle constituting information about the operation of the vehicle;

selectively and automatically establishing a communications channel between the vehicle and a remote facility without manual intervention to thereby enable the information about the occupancy of the vehicle and the information about the operation of the vehicle to be transmitted to the remote facility to enable assistance to be provided to the vehicle based on the transmitted information; and at the remote facility, considering the information about the occupancy of the vehicle and the information about the operation of the vehicle received from the vehicle and directing assistance to the vehicle based on the transmitted information, the step of selectively selectively and automatically establishing a communications channel between the vehicle and a remote facility without manual intervention comprising the step of addressing a transmission of information about the occupancy of the vehicle differently than a transmission of information about the operation of the vehicle.

35. The method of claim 34, further comprising the steps of:

obtaining images of the passenger compartment of the vehicle; and transmitting the images of the passenger compartment after a crash involving the vehicle.

36. The method of claim 35, further comprising the steps of:

determining when the vehicle experiences a crash, the step of obtaining images of the passenger compartment comprising the step of obtaining images including the driver of the vehicle; and transmitting the images of the passenger compartment just prior to the crash once it has determined that the vehicle has experienced a crash.

37. The method of claim 34, wherein the step of determining at least one property or characteristic of occupancy of the vehicle comprises the step of determining any motion in the passenger compartment of the vehicle, whereby information about any motion of occupants in the passenger compartment is transmitted as part of the information about the occupancy of the vehicle.

38. The method of claim 34, wherein the step of determining at least one property or characteristic of occupancy of the vehicle comprises the step of determining the number of occupants in the passenger compartment, the number of occupants in the passenger compartment being transmitted as part of the information about the occupancy of the vehicle.

39. The method of claim 38, wherein the step of determining the number of occupants in the vehicle comprises the steps of receiving waves, energy or radiation from all of the seating locations in the passenger compartment and determining the number of occupants in the passenger compartment from the received waves, energy or radiation, the number of occupants in the passenger compartment being transmitted as part of the information about the occupancy of the vehicle.

40. The method of claim 38, wherein the step of determining the number of occupants in the vehicle comprises the step of arranging at least one heartbeat sensor in the vehicle to detect the presence of heartbeats in the vehicle such that the number of occupants is determinable from the number of detected heartbeats.

41. The method of claim 38, wherein the step of determining the number of occupants in the vehicle comprises the step of arranging at least one weight sensor system in the vehicle to detect at least one of the weight and weight distribution applied to the seats such that the number of occupants is determinable from the at least one of the detected weight and weight distribution.

42. The method of claim 38, wherein the step of determining the number of occupants in the vehicle comprises the step of arranging at least one temperature sensor to measure temperature in the passenger compartment whereby the number of occupants is determinable from the measured temperature in the passenger compartment.

43. The method of claim 38, wherein the step of determining the number of occupants in the vehicle comprises the step of arranging at least one seatbelt buckle switch to provide an indication of the seatbelt being buckled whereby the number of occupants is determinable from the buckled state of the seatbelts.

44. The method of claim 38, wherein the step of determining the number of occupants in the vehicle comprises the step of arranging at least one chemical sensor to provide an indication of the presence of a chemical indicative of the presence of an occupant whereby the number of occupants is determinable from the indication of the presence of the chemical indicative of the presence of an occupant.

45. The method of claim 38, wherein the step of determining at least one property of characteristic of occupancy of the vehicle further comprises the step of determining the condition of any occupants in the vehicle based on the received waves, energy or radiation, the condition of the occupants being transmitted as part of the information about the occupancy of the vehicle.

46. The method of claim 34, wherein the step of determining at least one property or characteristic of occupancy of the vehicles comprises the step of determining the number of human occupants in the passenger compartment.

47. The method of claim 34, further comprising the steps of:

sensing a state of the environment around and exterior of the vehicle; and transmitting information about the environment of the vehicle.

48. The method of claim 34, further comprising the step of determining when the vehicle experiences a crash, the step of transmitting information about the occupancy of the vehicle comprising the step of transmitting information when it has been determined that the vehicle has experienced a crash.

49. The method of claim 34, further comprising the steps of:

providing a memory unit in the vehicle to receive the information about the occupancy of the vehicle and store the information about the occupancy of the vehicle; and interrogating the memory unit to obtain the stored information about the occupancy of the vehicle to enable transmission thereof.

* * * * *